US010386796B2

(12) United States Patent
Charest-Finn et al.

(10) Patent No.: US 10,386,796 B2
(45) Date of Patent: Aug. 20, 2019

(54) MODEL PREDICTIVE CONTROLLER AND METHOD WITH CORRECTION PARAMETER TO COMPENSATE FOR TIME LAG

(71) Applicant: University of New Brunswick, Fredericton (CA)

(72) Inventors: Meaghan Ann Charest-Finn, Kedgwick River (CA); Rickey Dubay, Fredericton (CA)

(73) Assignee: University of New Brunswick, Fredericton, NB (CA)

( * ) Notice: Subject to any disclaimer, the term of this patent is extended or adjusted under 35 U.S.C. 154(b) by 1109 days.

(21) Appl. No.: 14/567,802

(22) Filed: Dec. 11, 2014

(65) Prior Publication Data

US 2016/0170384 A1    Jun. 16, 2016

(51) Int. Cl.
*G05B 13/02* (2006.01)
*G05B 15/02* (2006.01)
*G05B 13/04* (2006.01)

(52) U.S. Cl.
CPC ........ *G05B 13/048* (2013.01); *G05B 13/026* (2013.01); *G05B 15/02* (2013.01)

(58) Field of Classification Search
CPC ..... G05B 13/026; G05B 15/02; G05B 13/048
USPC .......................................................... 700/44
See application file for complete search history.

(56) References Cited

U.S. PATENT DOCUMENTS

| | | | |
|---|---|---|---|
| 7,317,953 B2* | 1/2008 | Wojsznis | G05B 11/32 700/28 |
| 7,653,445 B2 | 1/2010 | Chia | |
| 7,966,149 B2 | 6/2011 | Samardzija | |
| 8,032,235 B2 | 10/2011 | Sayyar-Rodsari | |
| 8,200,346 B2 | 6/2012 | Thiele | |
| 8,295,951 B2 | 10/2012 | Crisalle et al. | |

(Continued)

FOREIGN PATENT DOCUMENTS

| | | |
|---|---|---|
| CN | 103425048 A | 12/2013 |
| JP | WO2014091922 A1 | 6/2014 |

OTHER PUBLICATIONS

Charest et al, "Complex Trajectory Tracking Using MPC with Prediction Adjustment", Dec. 12, 2013, pp. 2148-2153.*

(Continued)

*Primary Examiner* — Brian W Wathen
*Assistant Examiner* — Olvin Lopez Alvarez
(74) *Attorney, Agent, or Firm* — Eugene F. Derényi; Fogler, Rubinoff LLP

(57) ABSTRACT

A new MPC controller design and method that may be applied to various different types of model predictive control (MPC) controllers and methods for use in any desired or appropriate controller setting, such as for plants, and can be imposed on conventional predictive control schemes to provide tighter control when tracking complex setpoint trajectories. The method introduces a correction parameter η, independent of plant gain, evaluated online at each control timestep to drive the plant output to its reference more accurately than the original schemes. In a linear system, the correction parameter converges to a constant when optimized (evaluated on-line). The new MPC controller and method can also be applied on a nonlinear system. In a non-linear system, where the time constant is non-linear, the correction parameter will be variable.

18 Claims, 25 Drawing Sheets

Standard MPC Algorithms
------ Additions/Adjustments for η-MPC Algorithms
Adjusted prediction block diagram.

(56) References Cited

U.S. PATENT DOCUMENTS

| | | | |
|---|---|---|---|
| 8,504,175 B2 | 8/2013 | Pekar et al. | |
| 2004/0249483 A1* | 12/2004 | Wojsznis | G05B 13/048 700/52 |
| 2005/0193739 A1* | 9/2005 | Brunell | G05B 13/042 60/772 |
| 2006/0173705 A1* | 8/2006 | Lee | G06Q 10/063 705/7.11 |
| 2009/0048748 A1* | 2/2009 | Zhao | B60W 10/04 701/59 |
| 2009/0198350 A1* | 8/2009 | Thiele | G05B 13/042 700/30 |
| 2010/0204808 A1* | 8/2010 | Thiele | G05B 17/02 700/30 |
| 2012/0116546 A1 | 5/2012 | Sayyar-Rodsari | |
| 2014/0249653 A1* | 9/2014 | Blevins | G05B 19/058 700/21 |
| 2016/0048119 A1* | 2/2016 | Wojsznis | G05B 19/0423 700/11 |

OTHER PUBLICATIONS

Charest et al, "MPC enhancement for tracking of complex profiles—The basic technique", Oct. 17, 2014, pp. 136-147.*
Tufa et al, "Effect of Model Plant Mismatch on MPC Performance and Mismatch Threshold Determination", 2016 pp. 1008-1014. (Year: 2016).*
Stephens et al, "Model Predictive Control for Reference Tracking on an industrial Machine Tool Servo Drive", May 2013, retrieved from https://ieeexplore.ieee.org/document/6327360, pp. 808-816. (Year: 2013).*
UNB libraries, "Model predictive control used in complex reference trajectory tracking", printed on Mar. 20, 2018; retrieved from "https://unb.on.worldcat.org/search?sortKey=LIBRARY&databaseList=2375%2C2572%2C3384%2 . . . " (Year: 2019).*
Meaghan Charest-Finn, "Model Predictive Control used in Complex Reference Trajectory Tracking",A Thesis Submitted in Partial Fulfillment of the Requirements for the Degree of MSc in Engineering at UNB, May 2013.
Zlark, Mohtadi,& Tuffs, Generalized predictive control—part 1. The basic algorithm. Automatica,23(2), 137-148, (1987).
Shridfiar, & Cooper, A tuning strategy for unconstrained SISO model predictive control. Industrial & Engineering Chemistry Research, 36, 729-746. (1997).
Meaghan Charest,Rickey Dubay,"MPC Enhancement for Tracking of Complex Profiles—The Basic Technique", University of New Brunswick, Department of Mechanical Engineering, 15 Dineen Drive, P.O.Box 4400, Fredericton, New Brunswick, Canada, E3B 5A3, Control Engineering Practice 33 ,2014,pp. 136-147.
Meaghan Charest,Rickey Dubay & Scott Everett, " Complex Trajectory Tracking Using MPC with Prediction Adjustment". Proceeding of the IEEE International Conference on Robotics and Biomimetics (ROBIO) Shenzhen, China, Dec. 2013, pp. 2148-2153.
Abu-Ayyad, Dubay, "SISO extended predictive control—formulation and the basic algorithm" ISA Transactions, 45, 9-20. (2006).
Abu-Ayyad, Dubay, " Improving the performance of generalized predictive control for nonlinear processes. Industrial & Engineering Chemistry Research", 49(10), 4809-4816.(2010).
Ali, Yu,& Hauser, "Unconstrained receding-horizon control of nonlinear systems. IEEE Transactions on Automatic Controls", 46(5), 776-783 (2001).
Bolognani,Peretti,& Zigliotto,"Design and implementation of model predictive control for electrical motor drives. IEEE Transactions on Industrial Electronics", 56(6), 1925-1936, (2009).
Chen,Lin,&Chen,"Intelligent adaptive control for MIMO uncertain nonlinear systems. Expert Systems with Applications", 35(3), 865-877, (2008).
Clark, Mohtadi,& Tuffs, Generalized predictive control—part 1. The basic algorithm. Automatica,23(2), 137-148, (1987).
Dalamagkidis, Valavanis,& Piegl, Nonlinear model predictive control with neural network optimization for autonomous autorotation of small unmanned helicopters. IEEE Transactions on Control System Technology, 19, 818-831, (2011).
Diehl, Amrit, & Rawlings, A Lyapunov function for economic optimizing model predictive control. IEEE Transactions on Automatic Control, 56, 703-707, (2011).
Dubay,Kember,Lakshminarayan,& Pramujati, Development of characteristic equations and robust stability analysis for SISO move suppressed and shifted DMC. ISA Transactions, 45, 21-33, (2006).
Dubay, Pramujati,Han,& Strohmaier,An investigation on the application of predictive control for controlling crew position and velocity on an injection molding machine. Polymer Engineering and Science, 47, 390-399. (2007).
Golshan, MacGregor, Bruwer, & Mhaskar, Latent variable Model Predictive Control (LV-MPC) for trajectory tracking in batch processes. Journal of Process Control, 20, 538-550.(2010).
Gregor, & Skrjanc, Tracking-error model-based predictive control for mobile robots in real time. Robotics and Autonomous Systems, 55, 460-469. (2007).
Hassan, Dubay, & Wang, Active vibration control of flexible one-link manipulator using a multivariable predictive controller. Mechatronics, 17, 311-323. (2007).
Jesus, & MacGregor, Latent variable MPC for trajectory tracking in batch processes. Journal of Process Control, 15, 621-663.(2005).
Kim, & Shim,A flight control system for aerial robots: Algorithms and experiments. Control Engineering Practice, 11, 1389-1400. (2003).
Lauri, Rossiter, Sanchisa, & Martineza, Data-driven latent-variable model-based predictive control for continuous processes. Journal of Process Control, 20, 1207-1219. (2010).
Lee, Model predictive control: Review of the three decades of develop-ment. International Journal of Control, Automation, and Systems, 9, 415-424. (2011).
Li, Su, Shao-Hsien Liu, & Chen, Dynamic balance control for biped robot walking using sensor fusion, Kalman filter, and fuzzy logic. IEEE Transactions on Industrial Electronics, 59, 4394. (2012).
Magni, & Scattolini, On the solution of the tracking problem for nonlinear systems with MPC. International Journal of Systems Science, 36, 477-484.(2005).
Mayne, Rawlings, Rao, & Scokaert, Constrained model predictive control: Stability and optimality. Automatica, 36, 789-814.(2000).
Qin, & Badgwell, "A survey of industrial model predictive control technology. Control Engineering Practice, 2, 733-764". (2003).
Ren, & Beard, Trajectory tracking for unmanned air vehicles with velocity and heading rate constraints. IEEE Transactions on Control Systems Technology, 12, 706-716. (2004).
Runzi, & Low, A repetitive model predictive control approach for precision tracking of a linear motion system. IEEE Transactions on Industrial Electronics, 56, 1955-1961.(2009).
Shridhar, & Cooper, A tuning strategy for unconstrained SISO model predictive control. Industrial & Engineering Chemistry Research, 36, 729-746. (1997).
Yang, & Gao, Adaptive control of the filling velocity of thermoplastics injection molding. Control Engineering Practice, 8, 1285-1296. (2000).
D. Rowel, 2.151 Advanced System Dynamics and Control Review of First- and Second-Order System Response1 1 First-Order Linear System Transient Response Massachusetts Institute of Technology Department of Mechanical Engineering, Oct. 22, 2004, pp. 41.
Building and Estimating Process Models Using System Identification Toolbox™—MATLAB & Simulink—MathWorks—Makers of MATLAB and Simulink, mathworks.com, accessed Jan. 25, 2019, pp. 18.

* cited by examiner

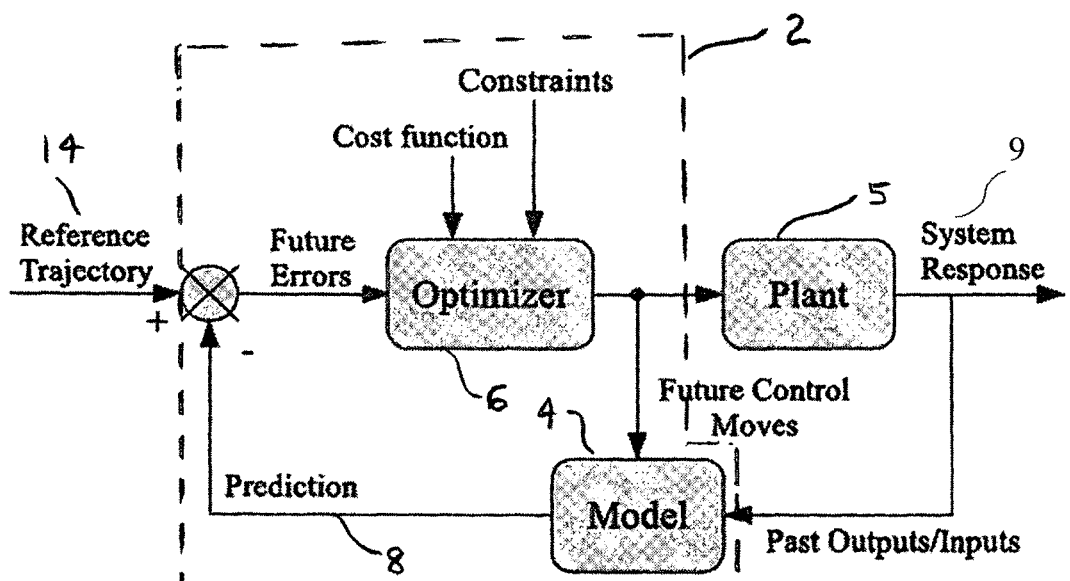
Fig. 1. MPC block diagram. (Prior Art)

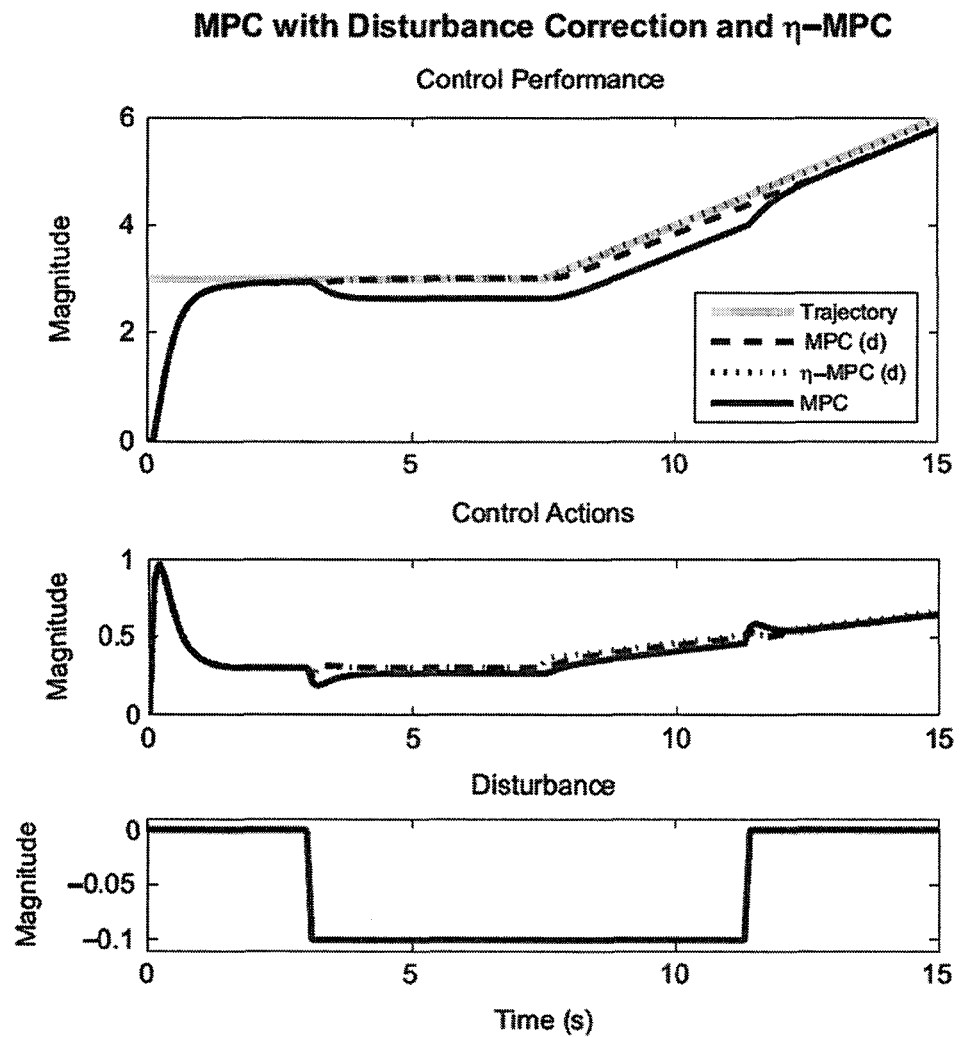
Fig. 2. Offset due to disturbances and complex reference trajectories.

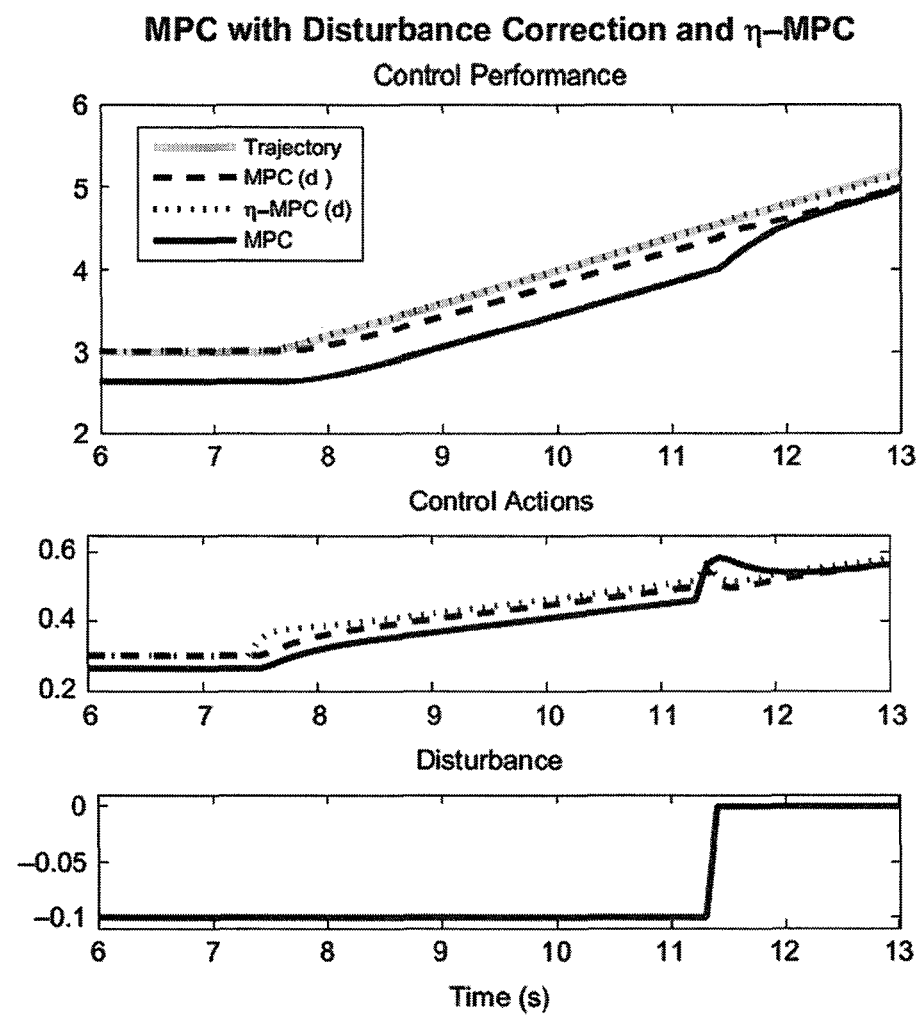
Fig. 3. Offset due to disturbances and complex reference trajectories — closeup of Fig. 2.

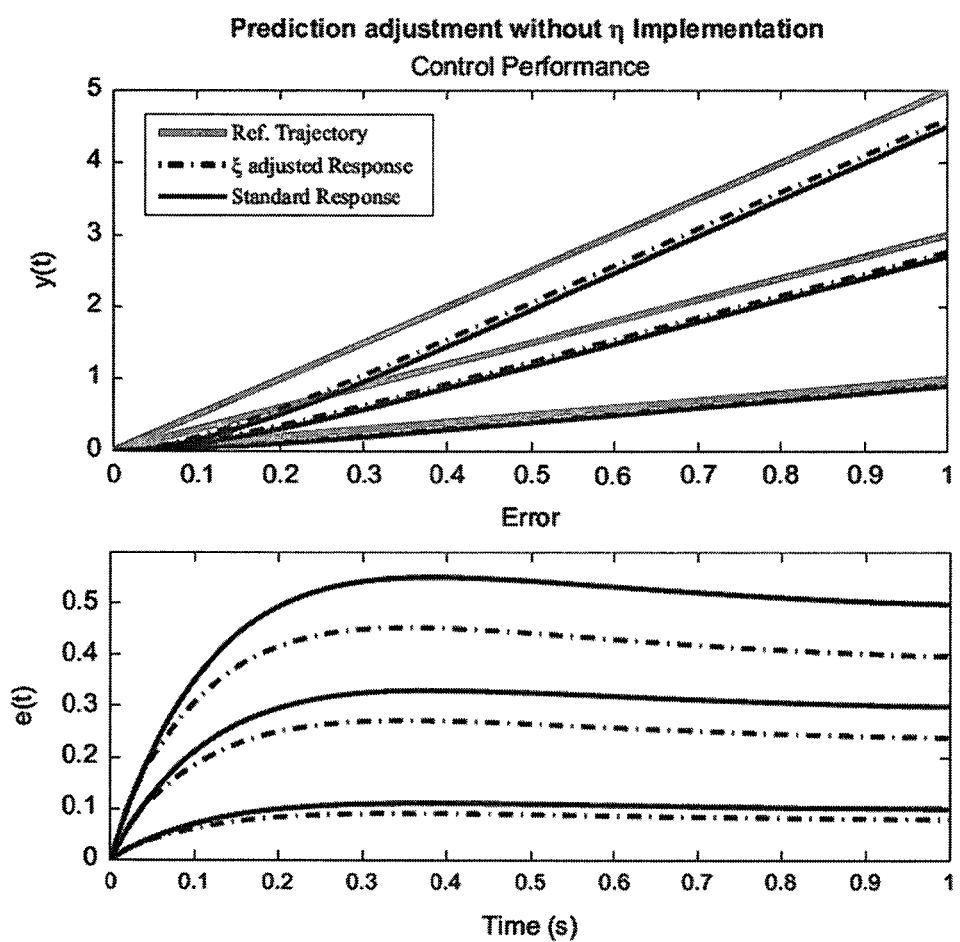
Fig. 4. DMC control of $K/(\tau s+1)$ with $\xi$ adjustment.

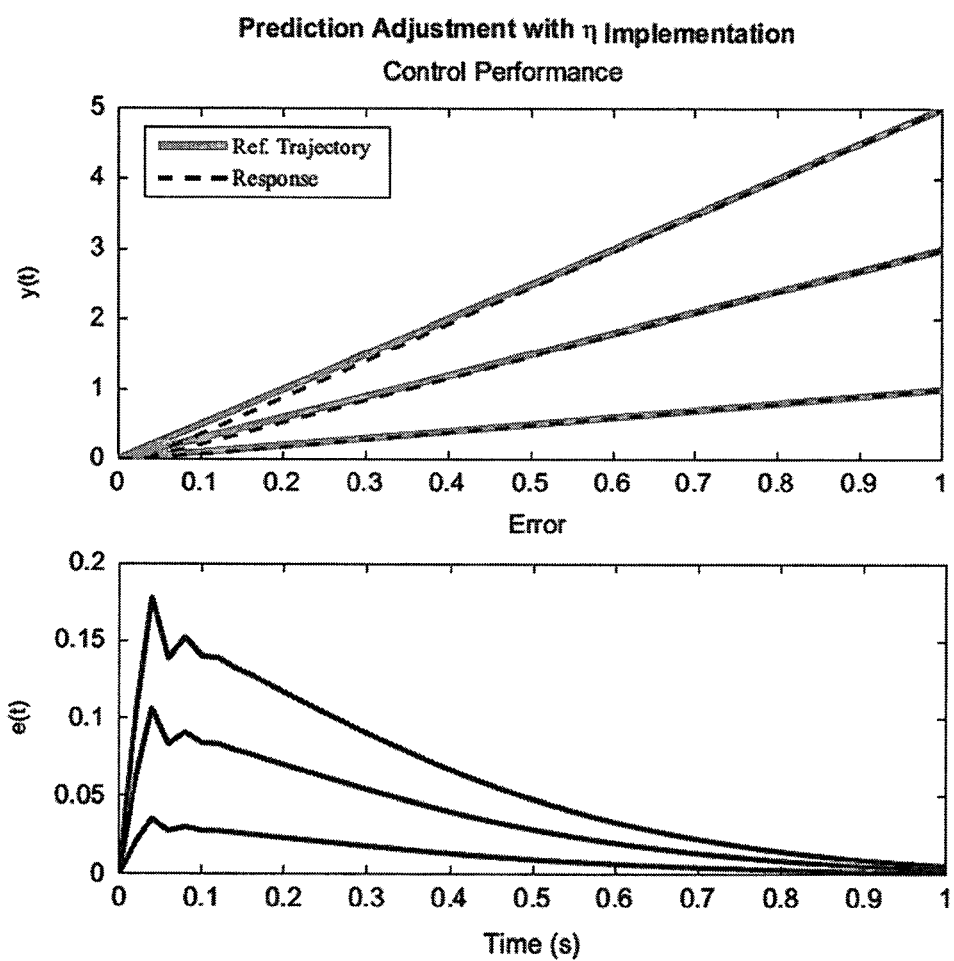
Fig. 5. $\eta$-DMC applied to $K/(\tau s+1)$.

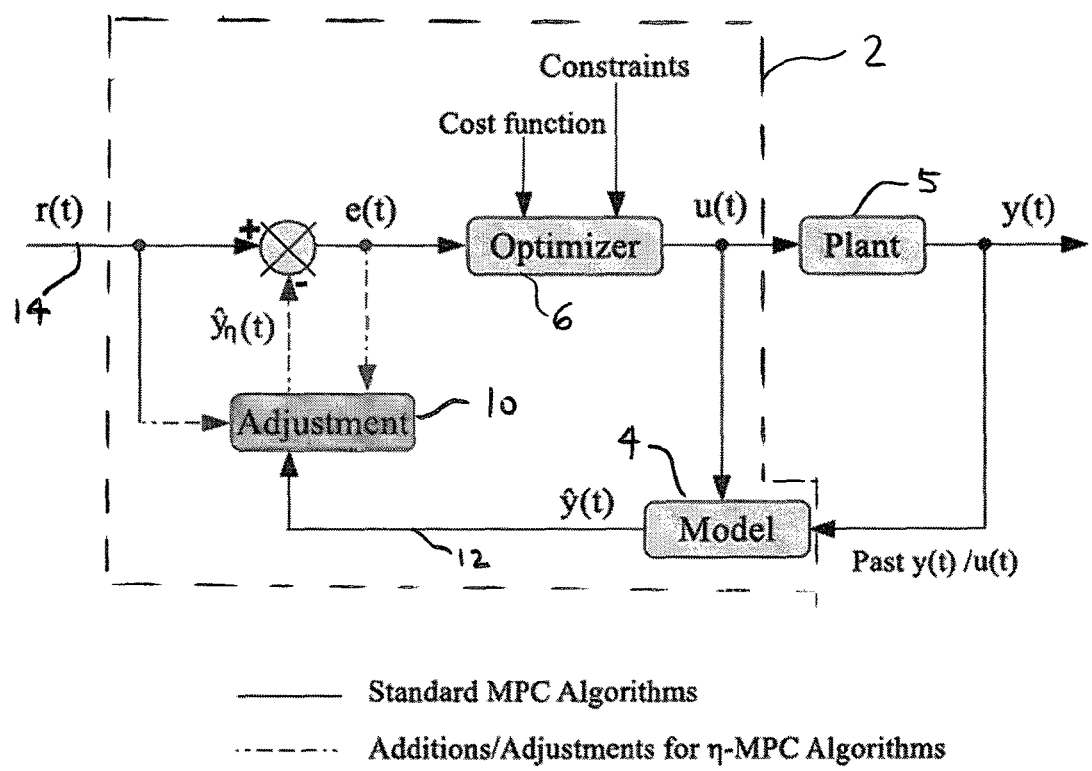
Fig. 6. Adjusted prediction block diagram.

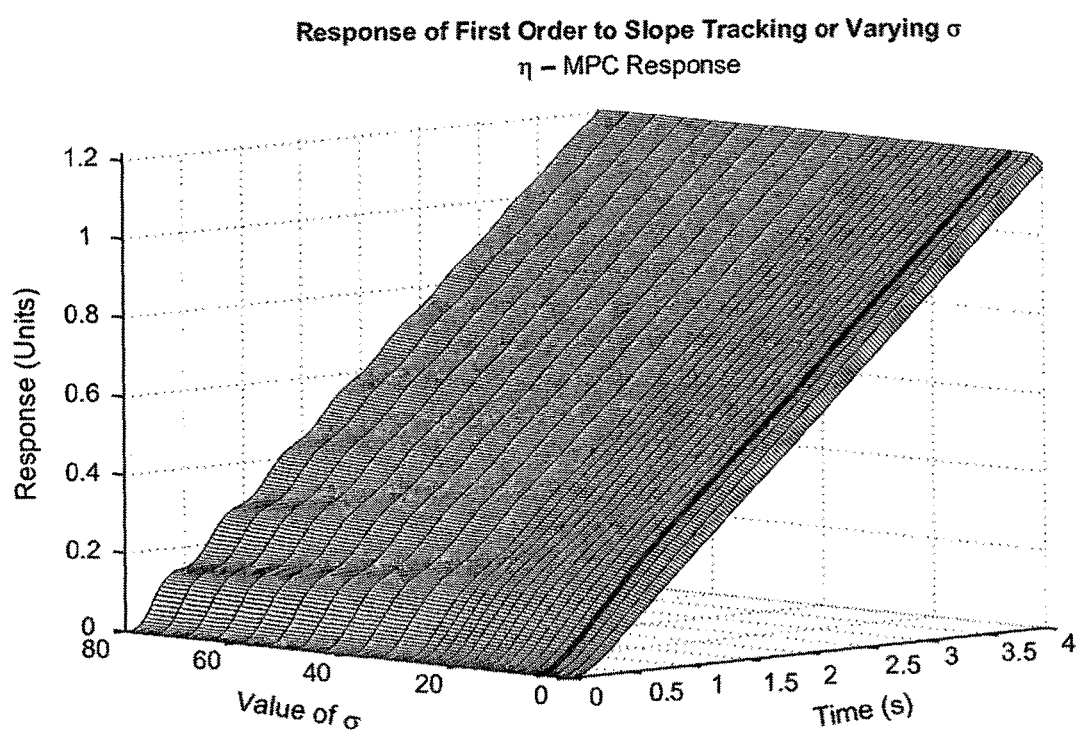
Fig. 7. Response dynamics resulting from different values of $\sigma$.

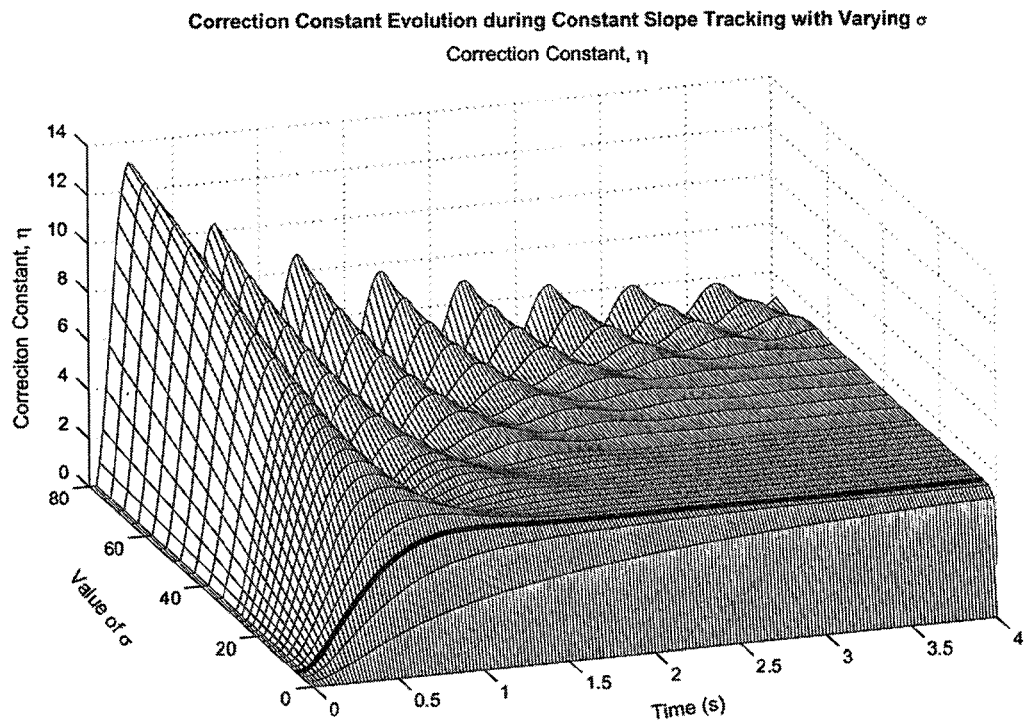
Fig. 8. $\eta$ dynamics resulting from different values of $\sigma$.
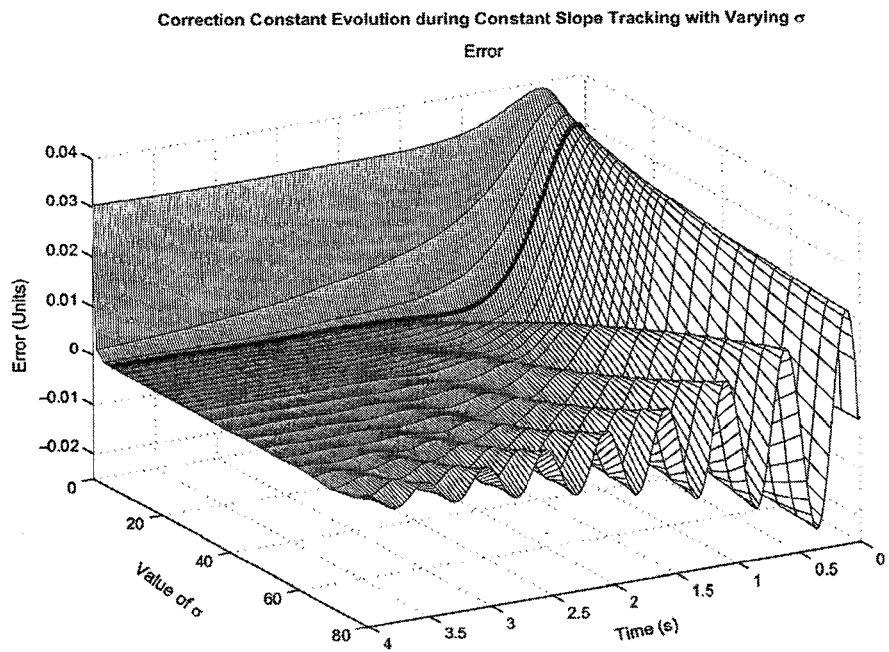
Fig. 9. Error dynamics resulting from different values of $\sigma$.

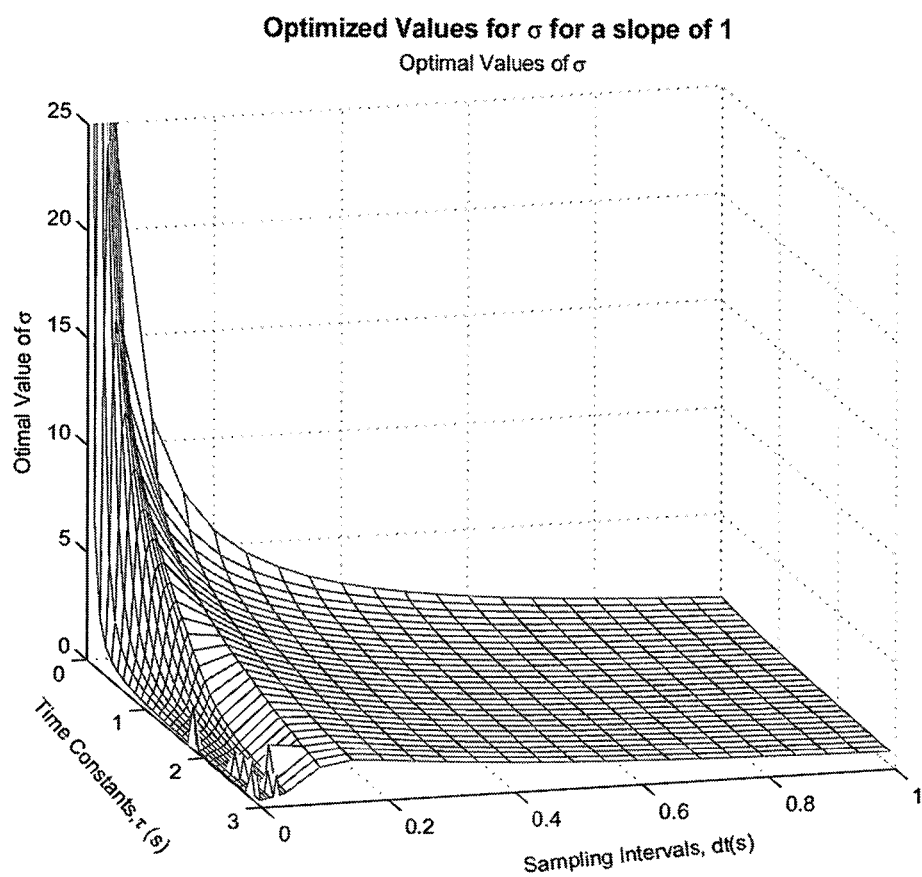
Fig. 10. Optimal values of sigma.

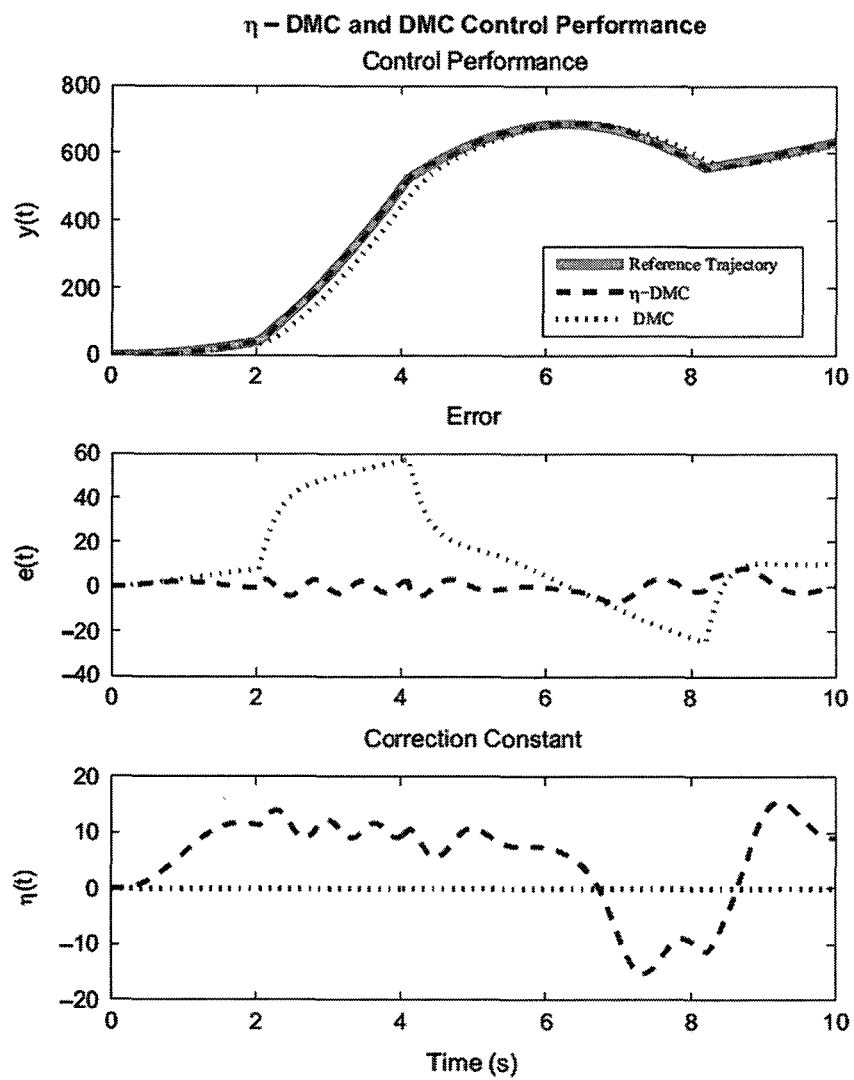
Fig. 11. Implementation of $\eta$-DMC on plant 1.

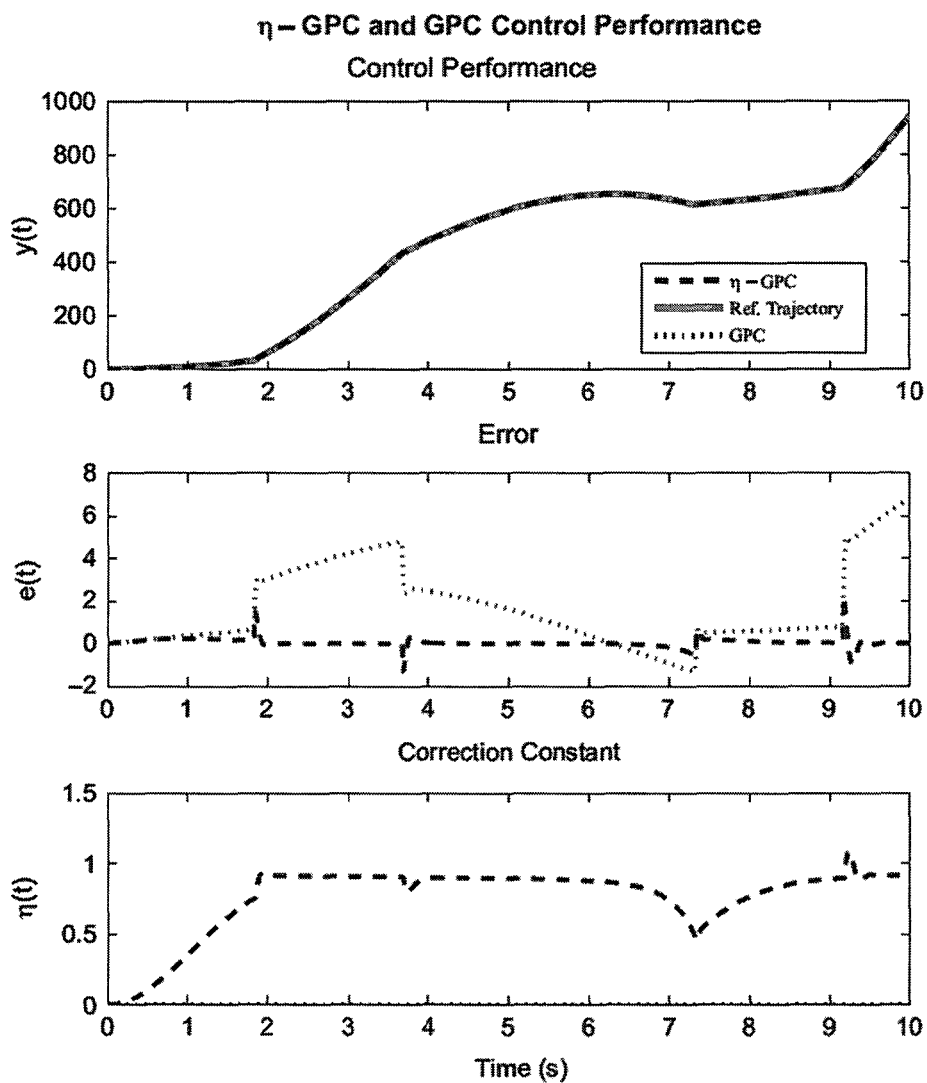
Fig. 12. Implementation of $\eta$-GPC on plant 1.

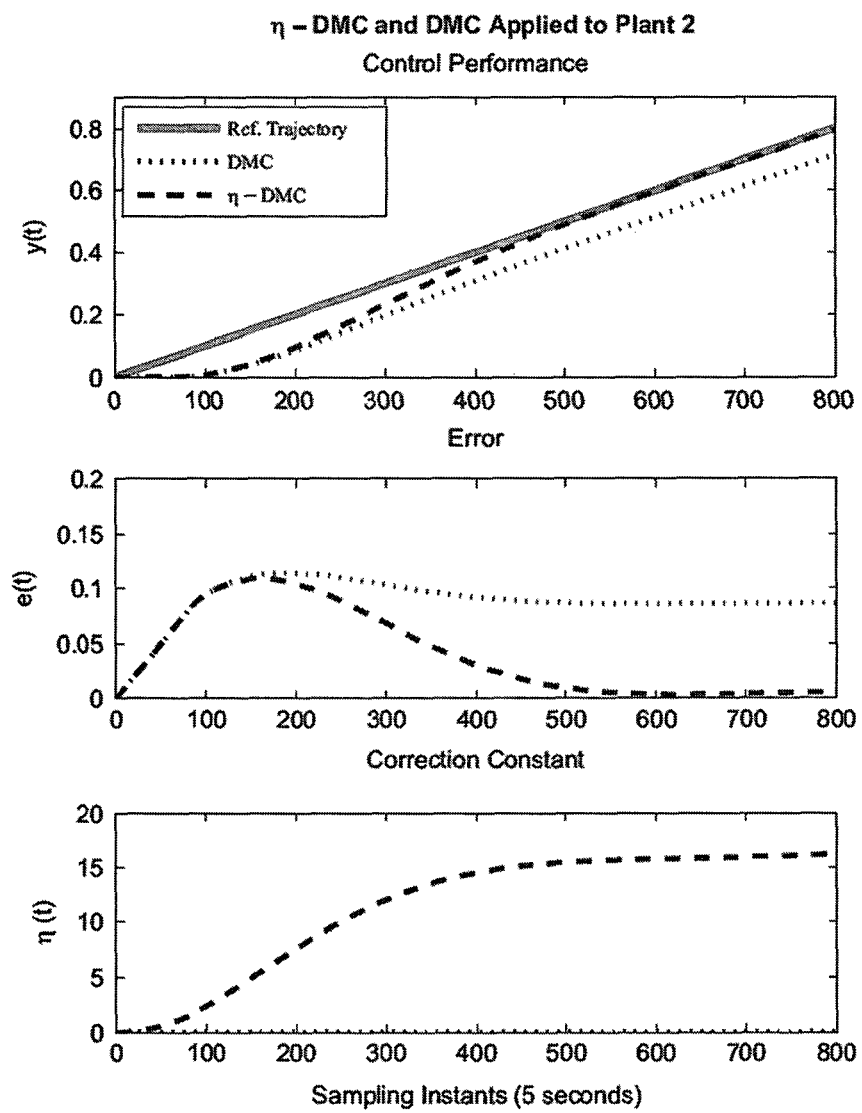
Fig. 13. Implementation of $\eta$-DMC on plant 2.

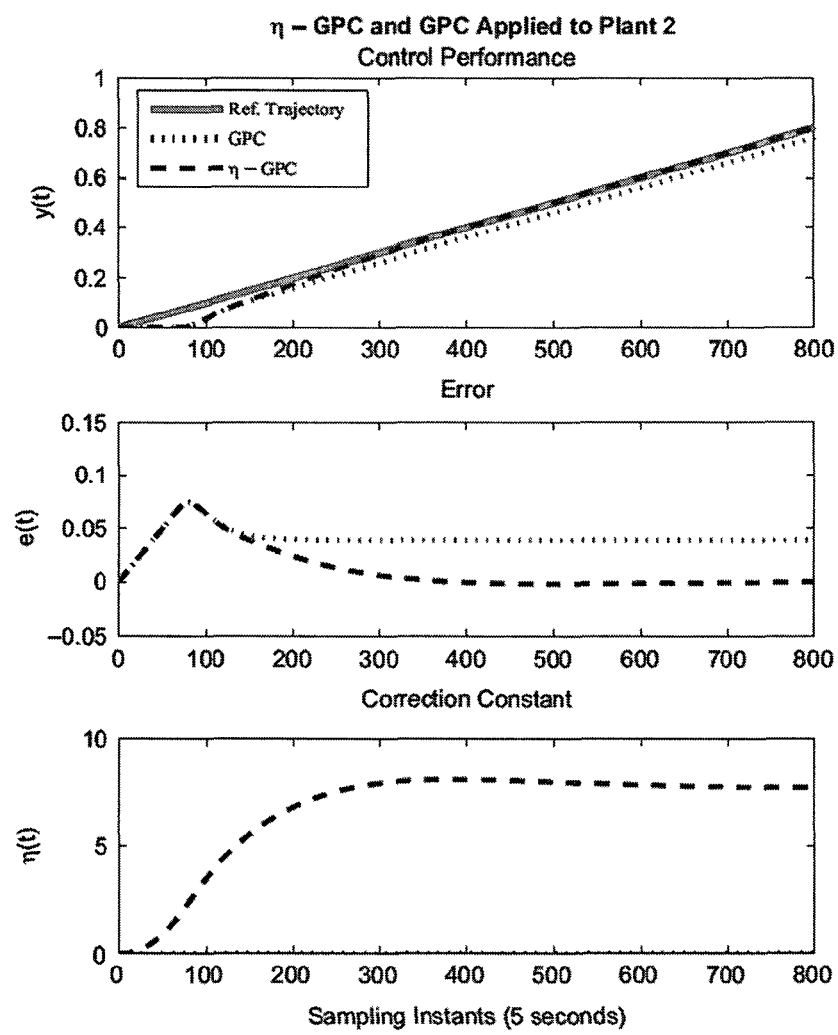
Fig. 14. Implementation of $\eta$-GPC on plant 2.

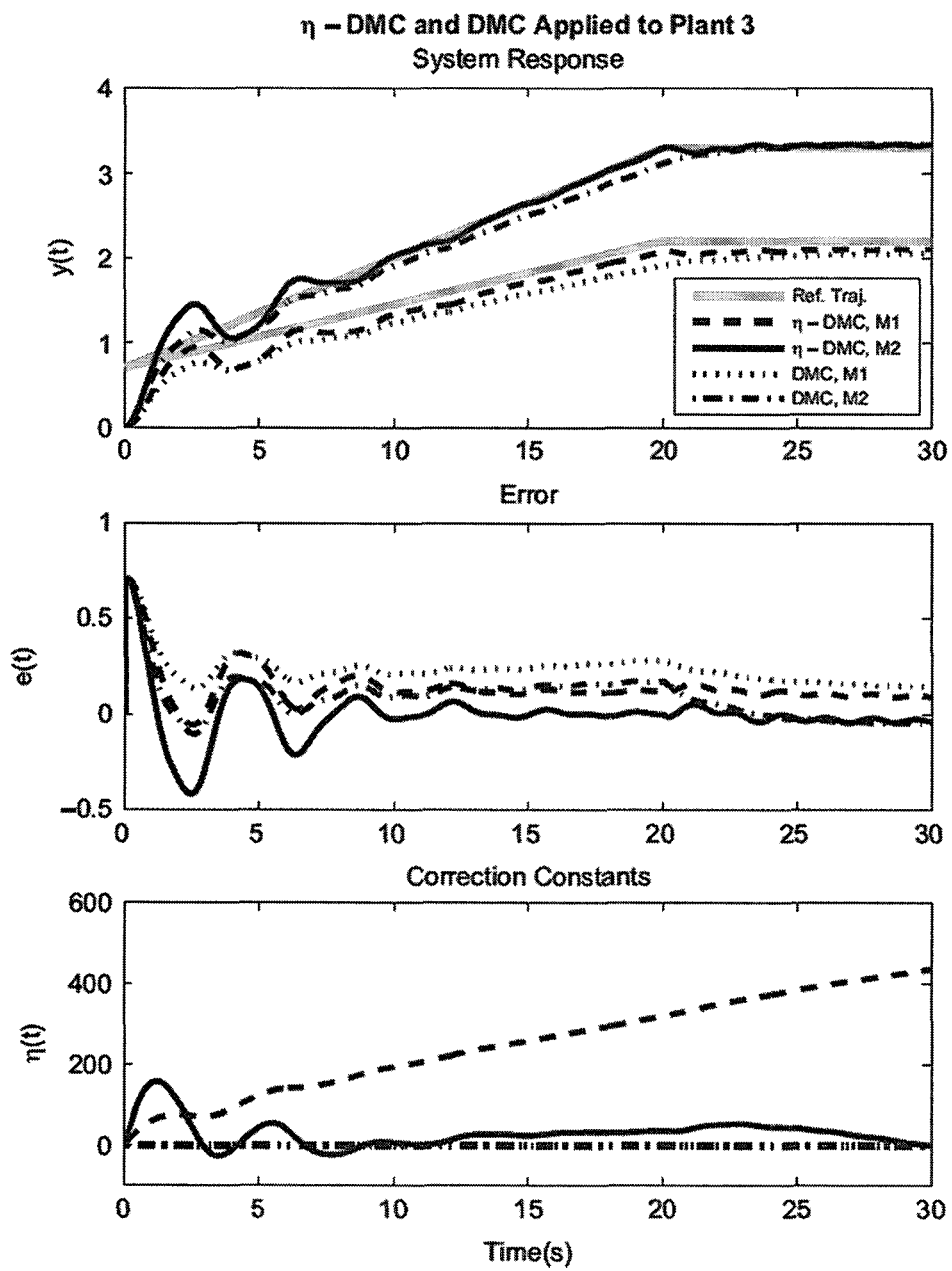
Fig. 15. Implementation of $\eta$-DMC on plant 3.

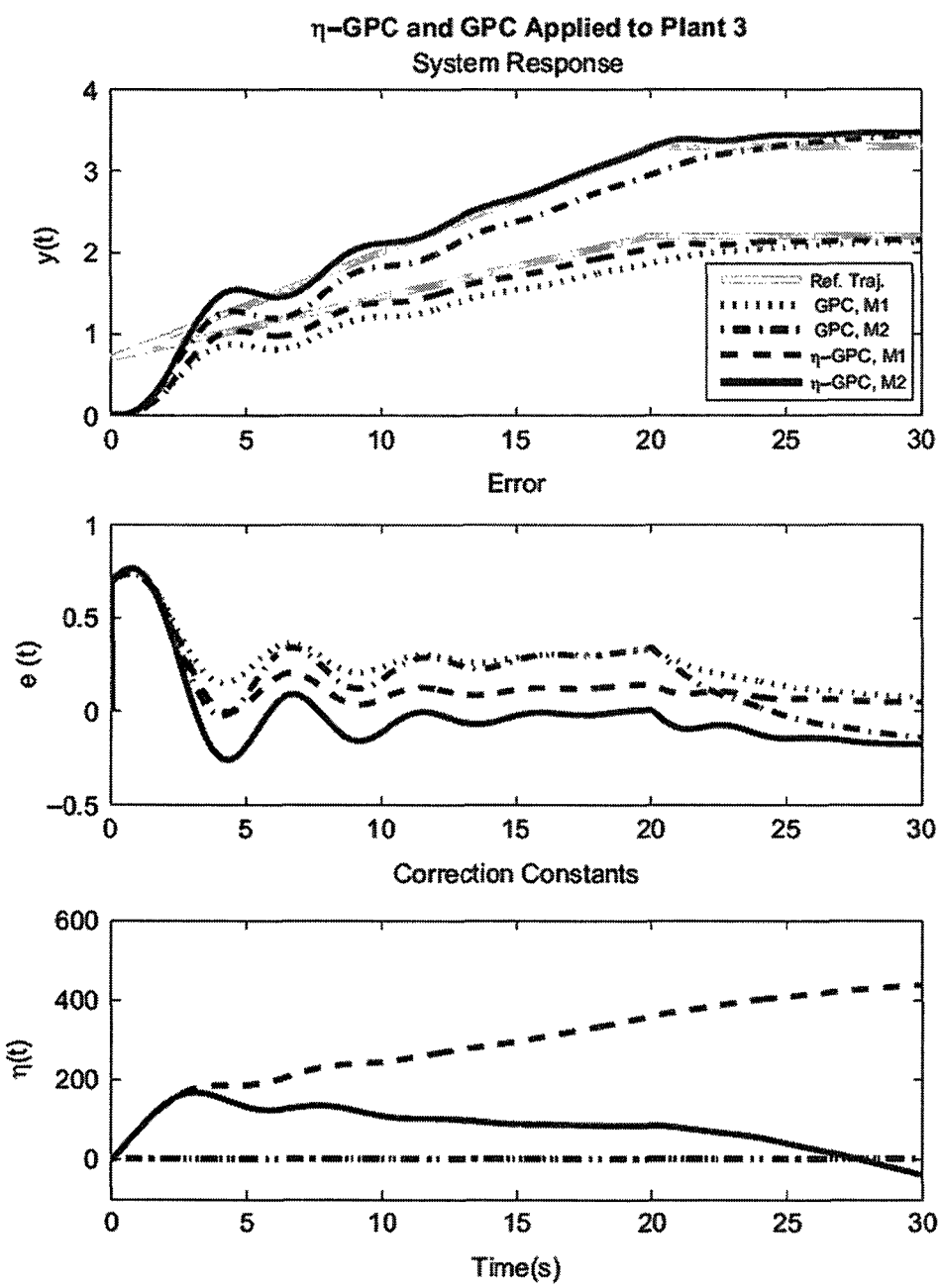
Fig. 16. Implementation of $\eta$-GPC on plant 3.

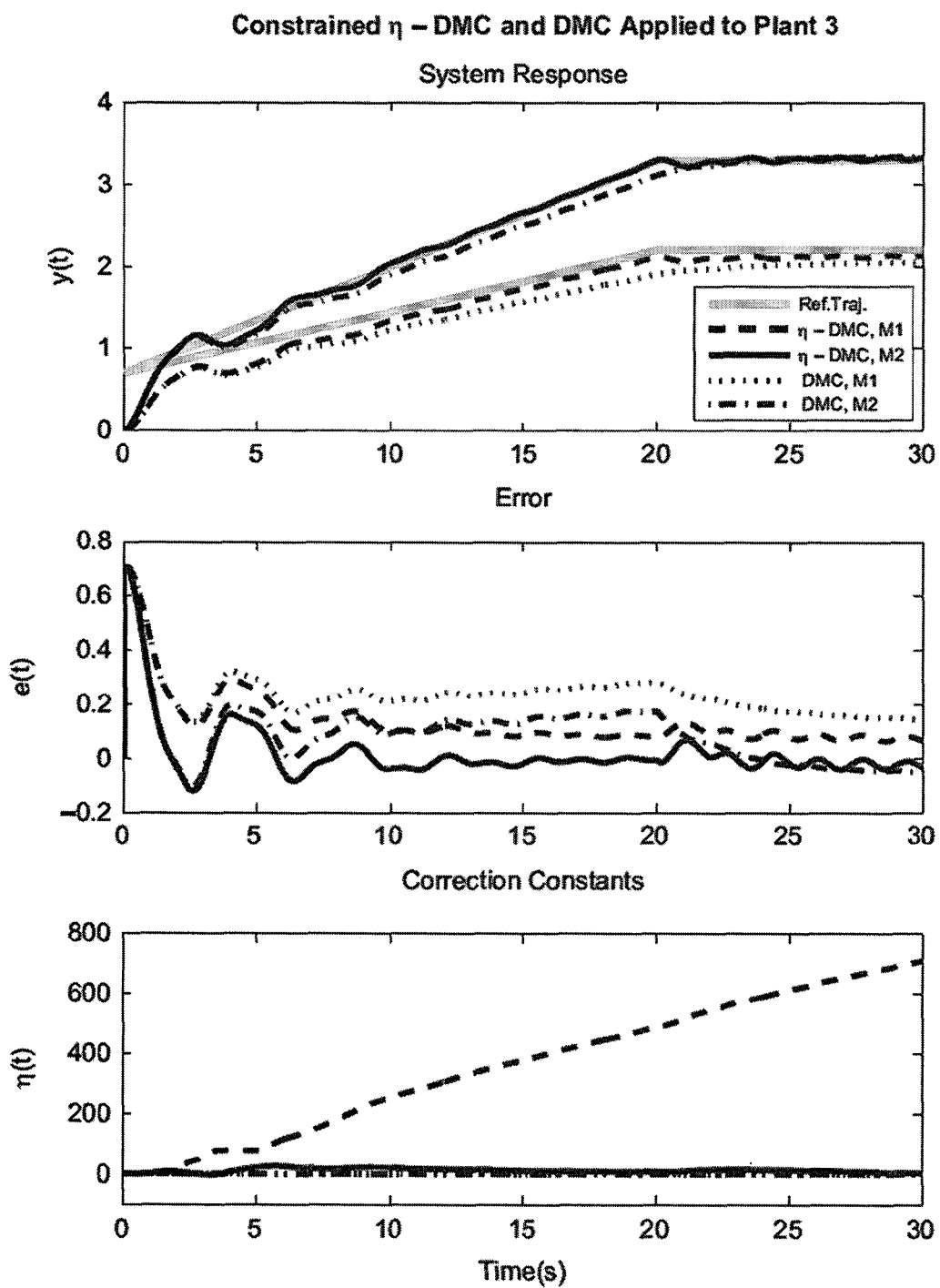
Fig. 17. Implementation of constrained $\eta$-DMC on plant 3.

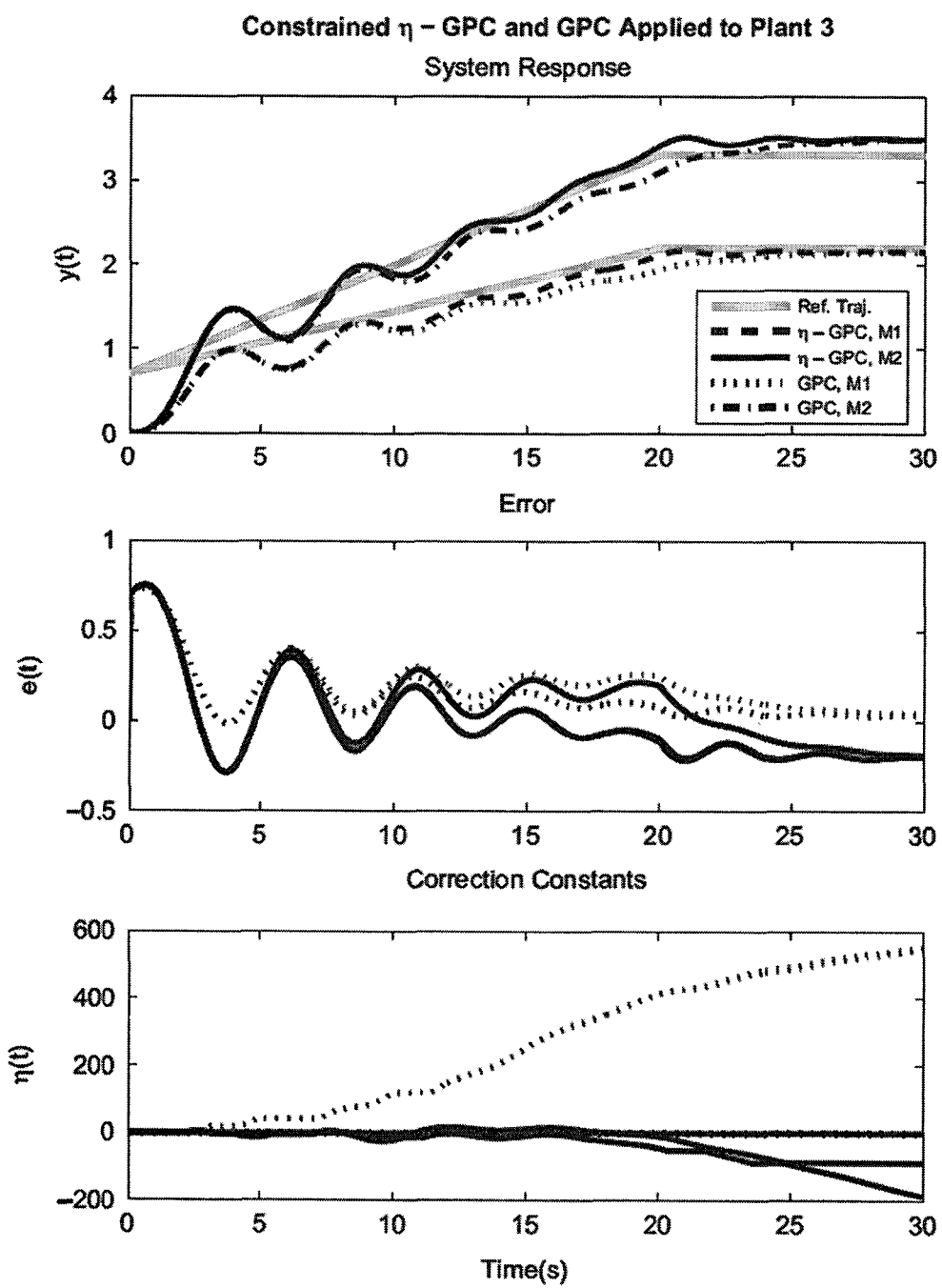
Fig. 18. Implementation of constrained $\eta$-GPC on plant 3.

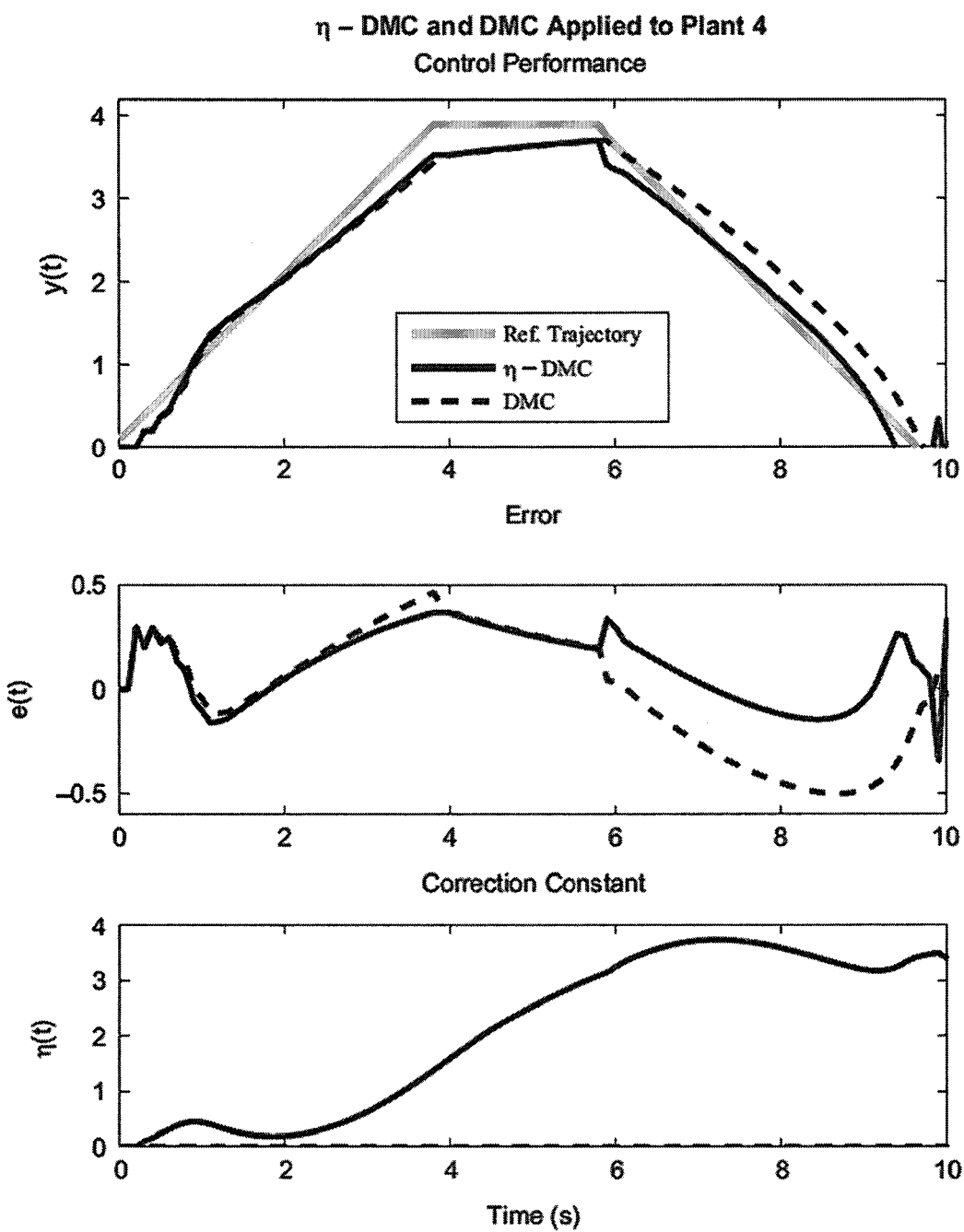
Fig. 19. Implementation of $\eta$-DMC on plant 4.

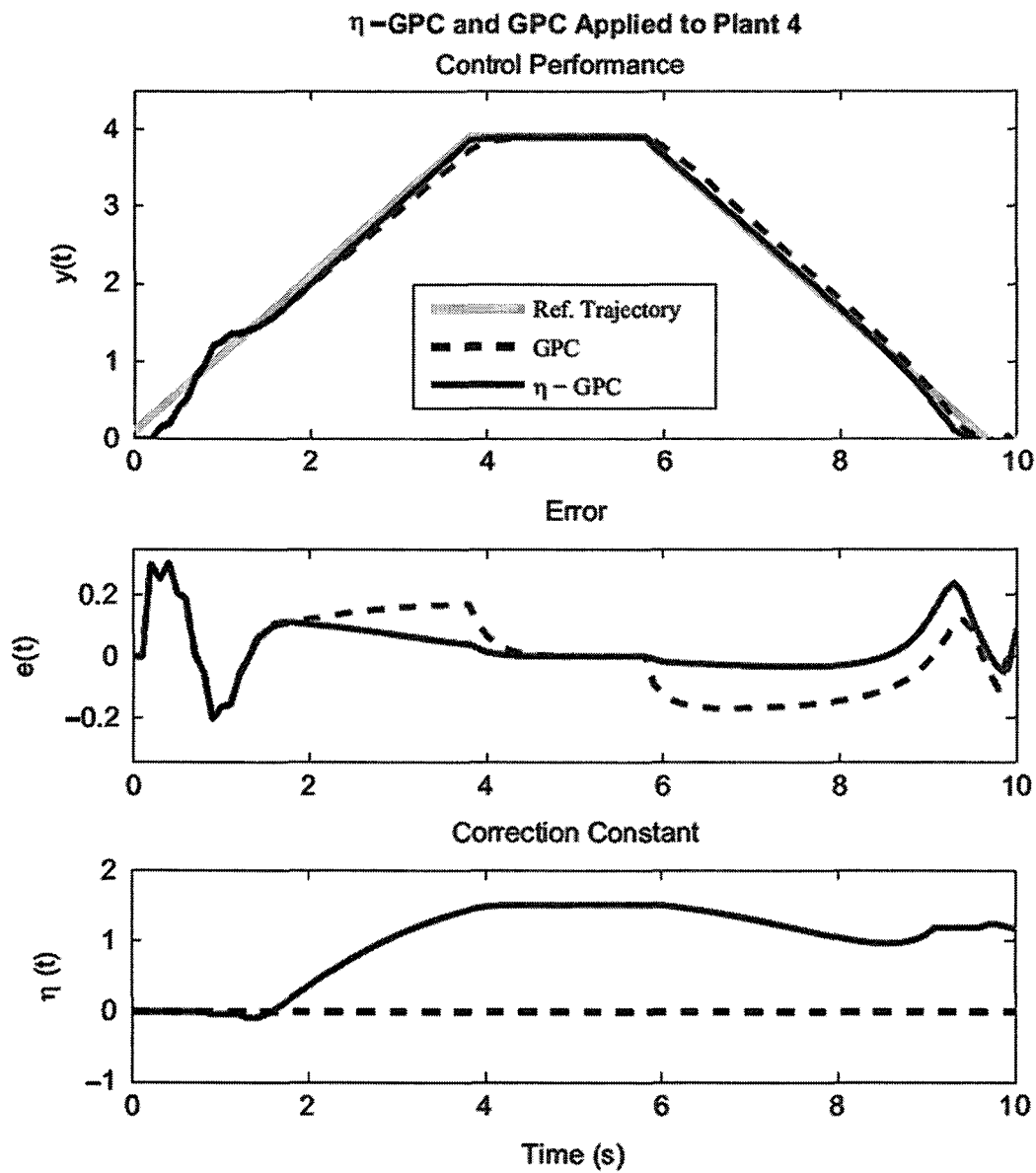
Fig. 20. Implementation of $\eta$-GPC on plant 4.

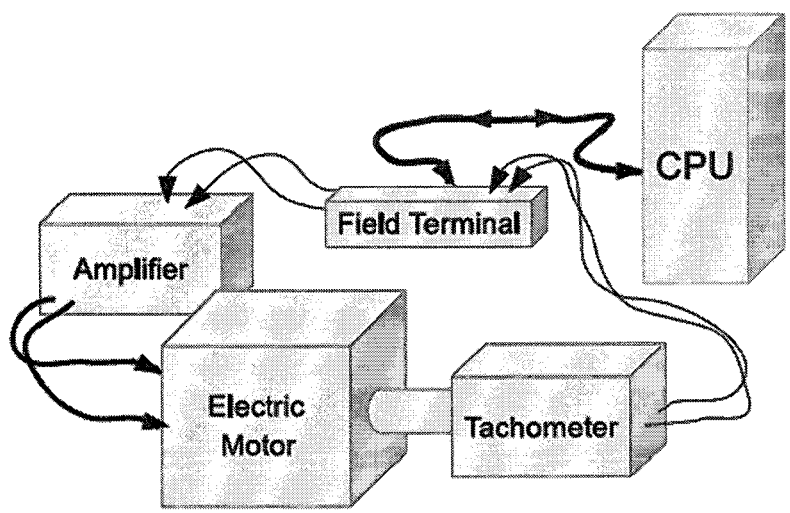
Fig. 21. Experimental setup.

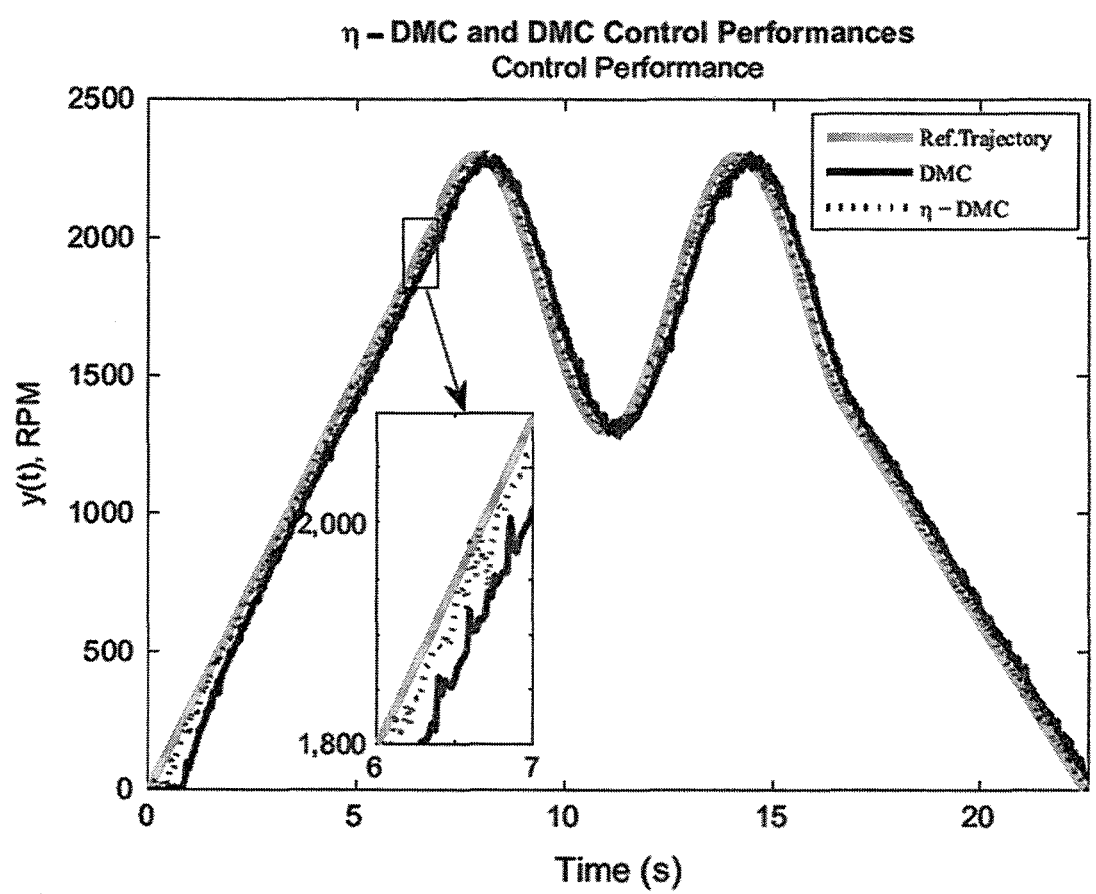
Fig. 22. Implementation of $\eta$-DMC on DC motor.

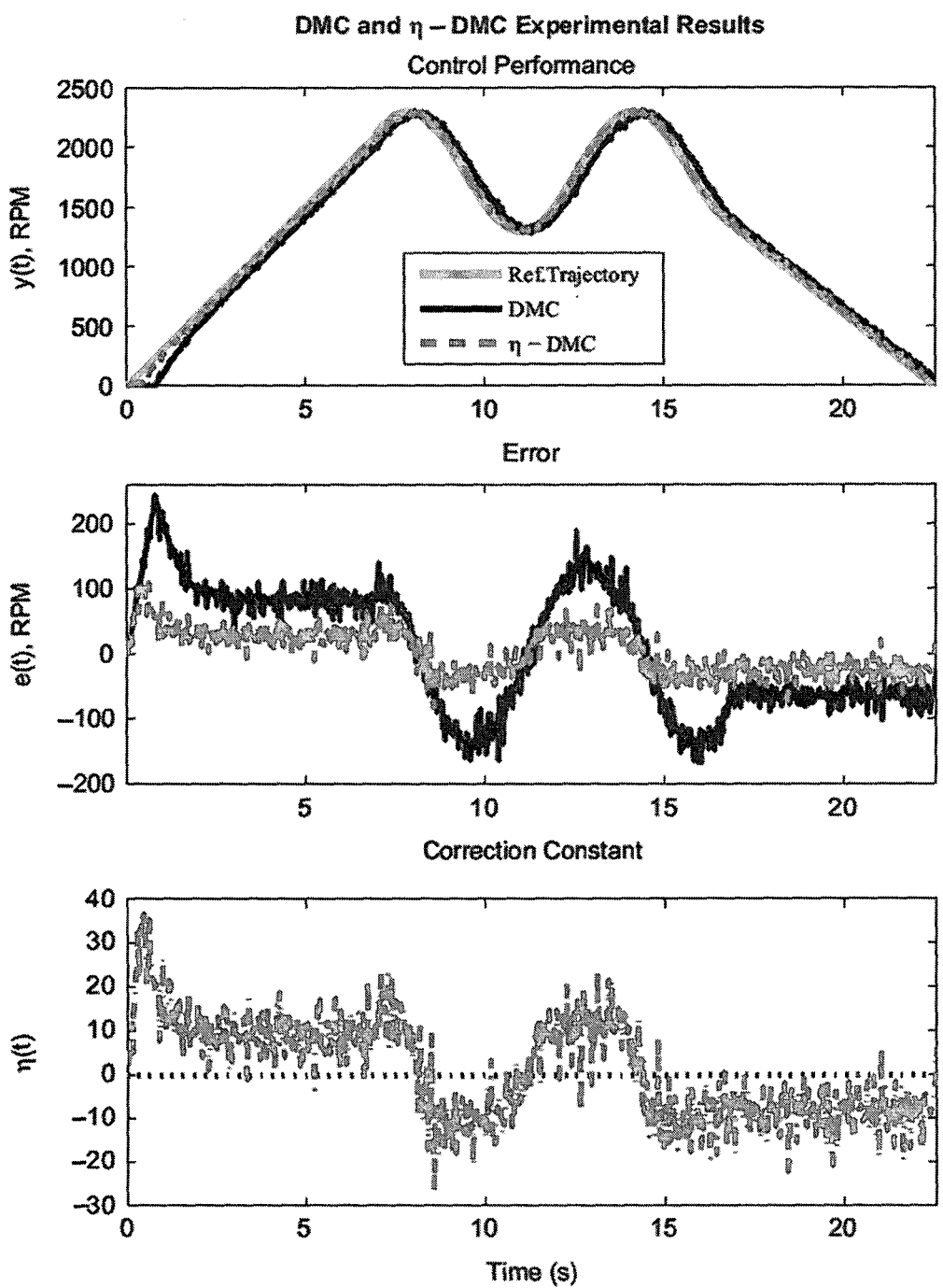
Fig. 23. Implementation of $\eta$-DMC on DC motor and parameters.

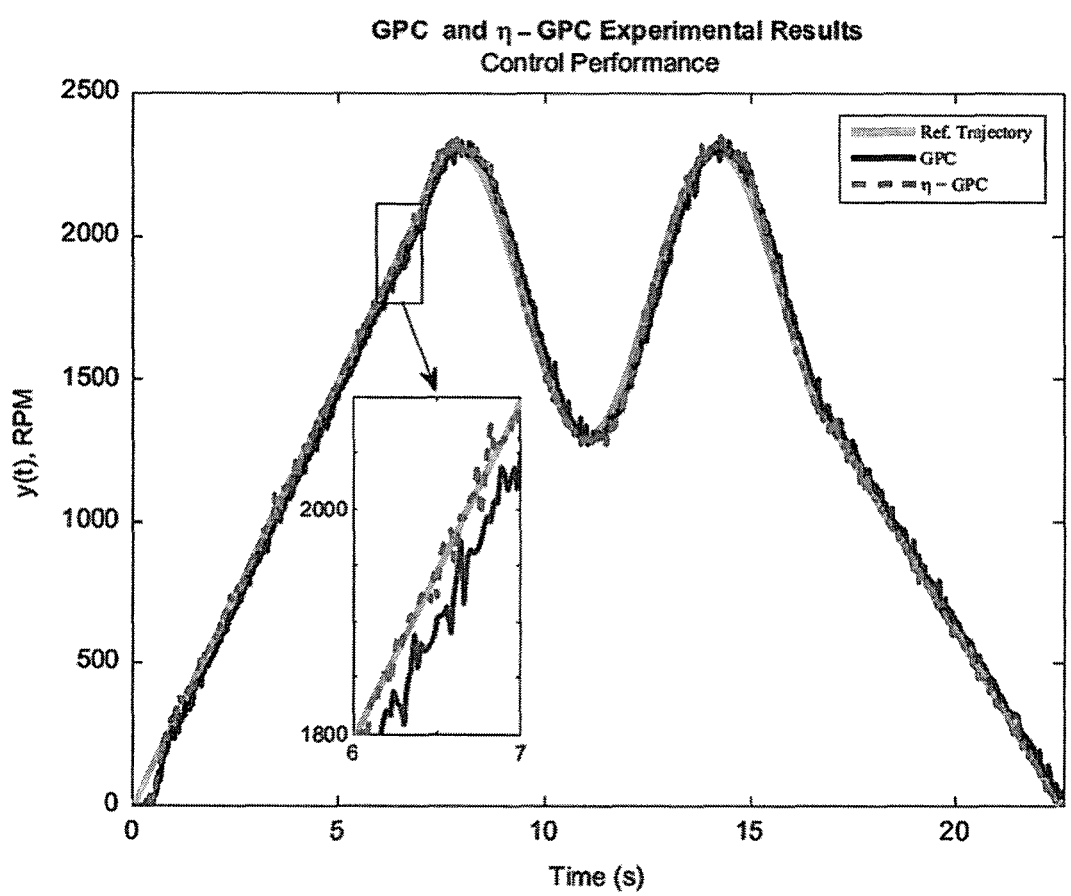
Fig. 24. Implementation of $\eta$-GPC on DC motor.

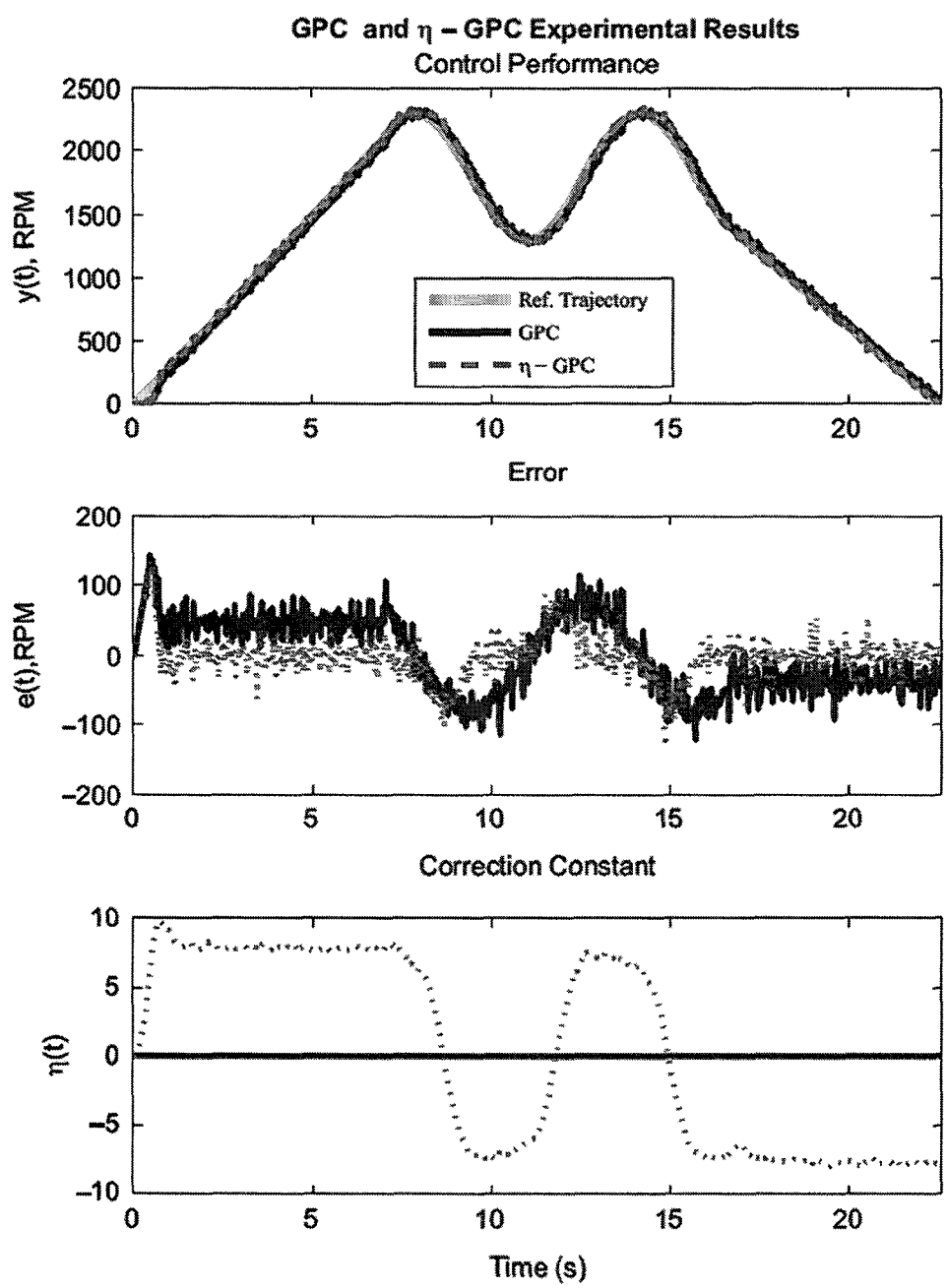
Fig. 25. Implementation of $\eta$-GPC on DC motor and parameters.

MODEL PREDICTIVE CONTROLLER AND METHOD WITH CORRECTION PARAMETER TO COMPENSATE FOR TIME LAG

TECHNICAL FIELD

This application relates to process control performed in, for example, an industrial process plant, and, more particularly, relates to an improved model predictive controller and method that uses a correction parameter to compensate for time lag.

DESCRIPTION OF BACKGROUND TECHNOLOGY

Research on Model-based Predictive Control (MPC) associated with theoretical work and practical applications has flourished over the past 30 years. A broad body of literature and a number of survey papers attest to this fact (Lee, 2011; Qin & Badgwell, 2003). MPC algorithms display a number of desirable features that enable them to be robust. They can perform in the presence of nonlinearities and modeling errors and can handle constraints and multi-variable plants (Diehl, Amrit, & Rawlings, 2011; Runzi & Low, 2009). As the field of MPC is an ongoing area of research, recent developments on new MPC algorithms include M-Shifted, extended predictive control, fast MPC, and latent variable MPC (Abu-Ayyad & Dubay, 2006; Dubay, Kember, Lakshminarayan, & Pramujati, 2006; Jesus & MacGregor, 2005). This in combination with advancements in the computer industry have allowed the MPC algorithm to extend to applications requiring small sampling times (Bolognani, Peretti, & Zigliotto, 2009; Diehl et al., 2011).

Early application of MPC algorithms to the process industry were generally subjected to relatively simple reference or setpoint trajectories. In standard applications the reference often settles at a fixed setpoint such as a temperature, a fluid level, or a speed in the case of motor speed control. The MPC methodology has been recently introduced to applications that include the field of robotics and Unmanned Aerial Vehicles (UAV) (Gregor & Skrjanc, 2007; Kim & Shim, 2003; Ren & Beard, 2004). Other current applications of MPC schemes include flexible manipulators (Hassan, Dubay, Li, & Wang, 2007) and plastic injection molding (Dubay, Pramujati, Han, & Strohmaier, 2007). In these cases the desired reference trajectories can be more complex. Standard MPC algorithms exhibit difficulty when tracking complex profiles (Golshan, MacGregor, Bruwer, & Mhaskar, 2010).

Little work has been done in terms of complex reference tracking with MPC control. It is becoming increasingly important for advanced control schemes to be able to track more complex reference trajectories for more efficient control (Ali, Yu, & Hauser, 2001; Mayne, Rawlings, Rao, & Scokaert, 2000). From an industrial perspective, tighter trajectory tracking can lead to better part quality and energy consumption. Latent variable MPC is one algorithm that has been recently designed in order to optimize trajectory tracking performance (Jesus & MacGregor, 2005). The latent variable scheme has successfully been applied to batch processes (Golshan et al., 2010; Lauri, Rossiter, Sanchisa, & Martineza, 2010). The method is an effective solution to the complex trajectory tracking problem but cannot be readily adapted to common or conventional forms of MPC.

The tracking offset apparent when tracking complex reference trajectories is identified as a result of the open loop system time constants that are not accounted for in controller prediction formulations. Different methods to correct steady state offset due to disturbance or model mismatch have been developed (Magni & Scattolini, 2005; Rawlings & Mayne, 2009). These methods have been designed for constant reference trajectory tracking and do not eliminate the offset tracking that exists when tracking slopes. Evidence of the complex trajectory tracking offset problem can be seen in Yang and Gao (2000), Dubay et al. (2007), Dalarnagkidis, Valavanis, and Piegl (2011), and Li, Su, Shao-Hsien Liu, and Chen (2012).

BRIEF DESCRIPTION OF THE DRAWINGS

FIG. 1 is a block diagram representation of a typical prior art MPC controller and control method;

FIG. 2 are graphs depicting control performance in the face of offset due to disturbances and complex reference trajectories;

FIG. 3 is an enlarged view of portions of the graphs of FIG. 2;

FIG. 4 are graphs of prediction adjustment using a prior art MPC method;

FIG. 5. is a graph comparing reference trajectories to response trajectories adjusted using a correction parameter according to a certain embodiment of the present invention;

FIG. 6 is block diagram representation of an MPC controller and control method according to an embodiment of the present invention;

FIG. 7 is a graph of response dynamics;

FIG. 8 is a graph of response dynamics;

FIG. 9 is a graph of error dynamics;

FIG. 10 is a graph of optimal values of sigma;

FIGS. 11-20 are graphs of control performance improvement according to embodiments of the present invention;

FIG. 21 is an experimental setup in which an MPC controller and method according to an embodiment of the present invention is implemented for control of a DC motor;

FIGS. 22-25 are graphs of results of the implementation of FIG. 21, and

DETAILED DESCRIPTION

Figure 26:
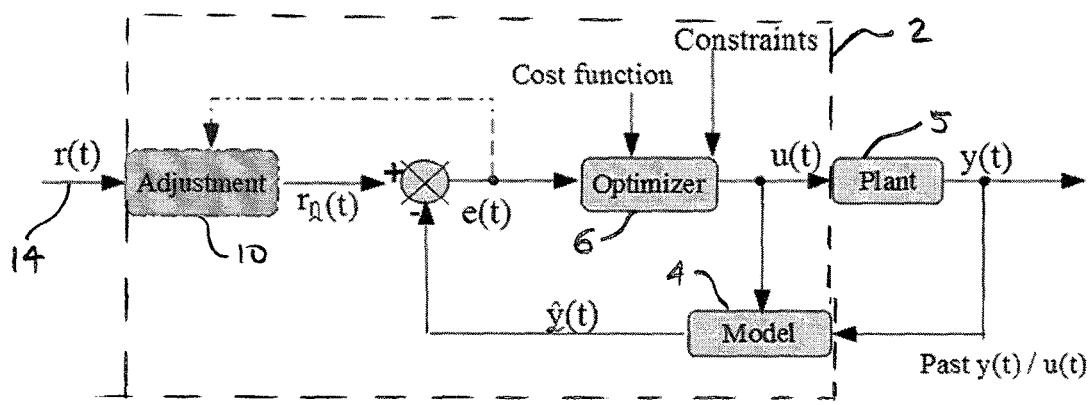
FIG. 26 is a block diagram representation of an MPC controller and control method according to an embodiment of the present invention

Generally speaking, a new MPC controller design and method is discussed herein that may be applied to various different types of model predictive control (MPC) controllers and methods for use in any desired or appropriate controller setting, such as for plants. As used herein, "plants" includes plants, processes and systems. However, this new MPC controller enhancement and method is particularly useful in control systems used to track complex profiles in plants, such as in industrial process plants, such as manufacturing plants, and can also be used for control in the automation industry, such as for robotics, UAV, injection molding and "smart technologies" where setpoints may be continuously updated by efficiency algorithms instead of operators. The new MPC controller enhancement and method is described herein as being implemented as an addition to conventional MPC algorithms that improve complex trajectory tracking performance at low computation cost. Simulations are provided herein on a practical plant with improved control performance as compared to the standard MPC schemes.

The new MPC controller enhancement design and method could also be implemented in other types of control environments including, for example, as a part of a centralized control system, or as part of a stand-alone control system, etc.

The new MPC controller design and methods described herein can be imposed on conventional predictive control schemes to provide tighter control when tracking complex setpoint trajectories. The method introduces a correction parameter η, independent of plant gain, evaluated online at each control timestep to drive the plant output to its reference more accurately than the original schemes. The new MPC controller and method can be applied to various systems that possess deadtime, higher order and multivariable characteristics with improved closed loop control. This is evidenced by significant reductions of mean square errors when using η. In a linear system, the correction parameter converges to a constant when optimized (evaluated on-line). The new MPC controller and method can also be applied on a nonlinear system. The algorithm was tested in simulation and on a practical setup, with reduced tracking error. In a non-linear system, where the time constant is non-linear, the correction parameter will be variable.

In one embodiment, the present invention relates to a computer-implemented method for correcting a prediction model output in a Model Predictive Controller for controlling a plant including measuring the difference between the prediction model output and a reference; calculating a correction parameter based on the measured difference; and applying the correction parameter to the prediction model output to adjust the prediction model output for time lag. In certain embodiments, the steps of measuring the difference and applying the correction are carried out on-line. In certain further embodiments, the reference is a reference trajectory and the plant being controlled has a trajectory profile where the reference trajectory is varying with respect to time. In certain further embodiments, the method further includes providing the adjusted prediction model output to an optimizer of the Model Predictive Controller. In certain further embodiments, the step of calculating the correction parameter further includes applying an optimization method to calculate the correction parameter. In certain further embodiments, the method further includes calculating an offset error based on the slope of the reference trajectory and using the offset error to calculate the correction parameter. In certain further embodiments, the method further includes repeating the measuring, calculating and applying steps at one or more additional sampling instances. In certain further embodiments, the method further includes In another embodiment, the present invention relates to a computer-implemented method for correcting a reference in a Model Predictive Controller for controlling a plant including measuring the difference between a prediction model output and the reference; calculating a correction parameter based on the measured difference; and applying the correction parameter to the reference to adjust the reference for time lag. In certain further embodiments, the steps of measuring the difference and applying the correction are carried out on-line. In certain further embodiments, the reference is a reference trajectory and the plant being controlled has a trajectory profile where the reference trajectory is varying with respect to time. In certain further embodiments, the method further includes providing the adjusted reference to an optimizer of the Model Predictive Controller. In certain further embodiments, the step of calculating the correction parameter further includes applying an optimization method to calculate the correction parameter. In certain further embodiments, the method further includes calculating an offset error based on the slope of the reference trajectory and using the offset error to calculate the correction parameter. In certain further embodiments, the method further includes repeating the measuring, calculating and applying steps at one or more additional sampling instances.

In another embodiment, the present invention relates to a Model Predictive Controller for controlling a plant including a controller unit that uses Model Predictive Control to generate a prediction model; measures the difference between the prediction model and a reference; calculates a correction parameter based on the measured difference; and applies the correction parameter to the prediction model output to adjust the prediction model output for time lag. In certain embodiments, the controller unit measures the difference and applies the correction on-line. In certain further embodiments, the reference is a reference trajectory and the plant being controlled has a trajectory profile where the reference trajectory is varying with respect to time. In certain further embodiments, the controller further comprises an optimizer and provides the adjusted prediction model output to the optimizer.

In another embodiment, the present invention relates to a Model Predictive Controller for controlling a plant including a controller unit that uses Model Predictive Control to generate a prediction model; measures the difference between the prediction model and a reference; calculates a correction parameter based on the measured difference; and applies the correction parameter to the reference to adjust the reference for time lag. In certain embodiments, the controller unit measures the difference and applies the correction on-line.

Model Predictive Control

FIG. 1 is a block diagram representation of a conventional general MPC algorithm in an MPC controller 2. In general, MPC algorithms are composed of three main components: a model 4 of the controlled plant 5, an optimizer 6 that evaluates control actions using an objective function combined with an optimization strategy, and a prediction 8 coming out of the model 4 that computes the future dynamic behavior of the plant output 9 or controlled variable.

The objective of MPC is to minimize the difference of the desired reference trajectory r(t+j) and the predicted state of the plant ŷ(t+j) for the duration of the prediction horizon N. The plant model and an optimization algorithm are used to construct the prediction of the plant behavior ŷ and an evaluation of future control actions, u. In the next section, key theoretical derivations of DMC and GPC algorithms will be presented for completeness and clarity.

Dynamic Matrix Control

DMC algorithms use a dynamic matrix P which represents the model of the controlled variable y. The formulation of P requires only a normalized step response or impulse response of the controlled variable. The dynamic matrix P for a single input single output (SISO) plant has dimensions $N \times n_u$ and is structured with an open loop test array p of length N:

$$P = \begin{pmatrix} p_1 & 0 & \cdots & 0 \\ p_2 & p_1 & \cdots & 0 \\ \vdots & \vdots & \ddots & \vdots \\ p_N & p_{(N-1)} & \cdots & p_{(N-n_a)} \end{pmatrix} \quad (1)$$

The parameter, $n_u$, is the control horizon and represents the current and future control actions. The length of the optimized control sequence u is $n_u$.

The cost function J, which comprises future errors is $$J = \sum_{j=1}^{N} [\hat{y}(t+j|t) - r(t+j)]^2 + \sum_{j=1}^{n_u} \lambda(j)[\Delta u(t+j-1)]^2 \quad (2)$$

The symbol $|_t$ indicates the value of the variable evaluated at time instant t with other parameters in the similar sense. Least squares optimization can be used to minimize J resulting in the change in control effort $\Delta u$:

$$\Delta u = (P^T P + \lambda I)^{-1} P^T e \quad (3)$$

where e is the predicted error and is determined by (r−ŷ) with r being a vector of length N with all elements equal to $r|_t$. The variable $\lambda$ is a move suppression constant that is added to the diagonal of the $P^T P$ matrix term to improve its condition number (Abu-Ayyad & Dubay, 2006).

The multivariable DMC is presented to encompass the applicability of DMC to the multiple input multiple output (MIMO) case. This extension requires the construction of $P_m$:

$$P_m = \begin{pmatrix} P_{m,l} & P_{m,l+1} & \cdots & P_{1,L} \\ P_{m+1,l} & P_{m+1,l+1} & \cdots & P_{m+1,L} \\ \vdots & \vdots & \ddots & \cdots \\ P_{M,1} & P_{M,l+1} & \cdots & P_{M,L} \end{pmatrix} \quad (4)$$

where each element of $P_m$ is a matrix of dimension $N \times n_u$ representing the open loop dynamics of $m^{th}$ output due to the $l^h$ input. The matrix $P_m$ therefore represents the M controlled variables and their corresponding effects due to L manipulated variables. Each of the $G_{m;k}$ matrices is constructed analogous to P as in the SISO plant, using step or impulse response data or otherwise.

Generalized Predictive Control

The GPC model formulation uses a controlled auto regressive with integrated moving average (CARIMA) model to formulate its predictions. It is necessary to use Diophantine recursion to formulate these predictions. The recursion is also used to obtain parameters necessary for the evaluation of u.

The CARIMA model used in the SISO GPC algorithm is described by Eq. (5) (Clark, Mohtadi, & Tuffs, 1987):

$$A(z^{-1})y(t) = B(z^{(-1)})u(t-1) + C(z^{-1})\frac{\zeta(t)}{\Delta} \quad (5)$$

$A(z^{-1})$ and $B(z^{-1})$ are polynomial coefficients that together describe the dynamics of the plant being modeled and controlled. A backward shift operator $z^{-1}$ is imposed to indicate previous sampling instants. The motor setup used to demonstrate this research has a manipulated variable expressed as a voltage input u. The controlled variable y(t) reacts to u in the form of an angular speed. The CARIMA model relates y(t) to u. The $C(z^{-1})$ polynomial is truncated to a value of 1 when it is associated with disturbances to the controller in the general form of white noise. Disturbances are represented by $\xi(t)$ in the CARIMA model and $\Delta = 1-z^{-1}$. Therefore, the GPC CARIMA model can be rewritten as $$A(z^{-1})y(t) = B(z^{-1})u(t-1) + \frac{\zeta(t)}{\Delta} \quad (6)$$

When considering a MIMO form of the CARIMA model $A(z^{-1})$ and $B(z^{-1})$ are polynomial matrices constructed from a transfer matrix $T(z^{-1})$ and the term C is an identity matrix I:

$$A(z^{-1}) = I_{n \times n} + A_1 z^{-1} + A_2 z^{-2} + \ldots + A_{n_a} z^{-n_a} \quad (7a)$$

$$B(z^{-1}) = B_0 + B_1 z^{-1} + B_2 z^{-2} + \ldots + B_{n_b} z^{-n_b} \quad (7b)$$

$$C(z^{-1}) = I_{n \times n} \quad (7c)$$

The CARIMA model matrices are used with Diophantine recursion to solve the model matrices for the evaluation of the prediction in GPC algorithms. The necessary terms for this evaluation are F, G and $G_f$ for the SISO GPC algorithm and F, G and $G_p$ in the case of the MIMO GPC algorithm (Clark et al., 1987).

The cost function for GPC is $$J(N_1, N_2) = \sum_{j=N_1}^{n_u} [\hat{y}(t+j) - r(t+j)]^2 + \sum_{j=1}^{N_2} \lambda(j)[\Delta u(t+j-1)]^2 \quad (8)$$

where $N_1$ and $N_2$ are the minimum and maximum costing horizons. Similar to DMC, Eq. (8) can be solved using least squares optimization to obtain $\Delta u$, the control moves to the DC motor:

$$\Delta u = (G^T G + \lambda I)^{-1} G^T (r-f) \quad (9)$$

The G matrix and f term are obtained from the Diophantine recursion.

The predicted response ŷ in the GPC algorithm is evaluated at every sampling instant as a combination of the free and forced response $$\hat{y} = Gu + F(z^{-1})y(t) + G_f(z^{-1})\Delta u(t-1) \quad (10)$$

The MIMO GPC is analogous to the SISO GPC algorithm where the long term prediction is expressed as $$\hat{y}(t+j|t) = G_j(z^{-1})\Delta u(t+j-1) + G_{jp}(z^{-1})\Delta u(t-1) + F(z^{-1})y(t), \quad j=N_1 \ldots N_2 \quad (11)$$

So that $$f = F(z^{-1})y(t) + G_{jp}(z^{-1})\Delta u(t-1) \quad (12)$$

At every sampling instant the optimal $\Delta u$ is evaluated using the matrices obtained from the Diophantine recursion and the prediction in both cases using Eq. (9).

Correction Parameter

In certain embodiments, the new MPC controller designs and methods suggested here are to be considered for reference profiles that are continuous and complex. The correction parameter η is developed as a solution to the complex trajectory tracking problem for MPC algorithms where disturbance and modeling errors have been addressed. The following discussion uses a DMC algorithm and standard Laplace first order plant models. Simulations and experiments are conducted in the next section using DMC and GPC approaches to demonstrate the versatility of the η-MPC solution.

η-MPC for Sloped Trajectory Offset

Predictive controllers are increasingly being used to track profiles such as ramps, sinusoids and other complex profiles. Current MPC formulation results in a steady error observed in tracking sloped trajectories. The offset that is being discussed here is identified as resulting from prediction formulation and plant time constants. Therefore, traditional disturbance rejection and modeling error compensating methods are not appropriate. FIGS. 2 and 3 show the performances of three MPC approaches given a known disturbance, they are a standard MPC algorithm, a disturbance based MPC algorithm and an introduced η-MPC method with the disturbance rejection feature.

FIGS. 2 and 3 demonstrate that even when a disturbance is known and accounted for there still exists an offset when using standard MPC methods to track ramp reference trajectories. The MPC algorithm used in the simulation is DMC which accounts for modeling errors by adding the difference of the first element of ŷ and the measured plant response. One of the reasons that the offset still exists is because the optimization of the controller at each time instant is evaluated over the prediction horizon with a constant future setpoint value. This standard approach is not appropriate for time varying reference profiles. It is important to note that future reference trajectory may not always be known and it is desirable to have a tracking solution that is independent of future knowledge of the reference trajectory. In order to achieve this and reduce the offset error, the standard formulation of ŷ needs to be altered in current MPC algorithms. To do so the following assumptions are made.

Assumption 1. In order to adjust the prediction obtained by the MPC algorithm the reference trajectory slope will increase from instant (t) to instant (t+1) by the same amount as it did from instant (t−1) to time instant (t). That is that is constant from (t−1) until (t+1):

$$\xi_t = r|_t - r|_{t-1} \quad (13)$$

$$r|_{t+1} - r|_t = r|_t - r|_{t-1} \quad (14)$$

Assumption 2. Based on the performance of traditional MPC schemes, the corresponding offset error is proportional to the slope of the reference trajectory.

Given the above assumptions, an initial adjustment to ŷ is made as $$\hat{y}_c = \hat{y} + \xi_t \quad (15)$$

In support of the above assumptions the modification in Eq. (15) is applied to the standard DMC algorithms and is simulated here. FIG. 4 shows the small improvement that ξ makes for three different constant sloped setpoint profiles. For convenience of presentation, the control actions are excluded from the remainder of simulation figures.

The simulation in FIG. 4 shows that the ξ adjustment to ŷ reduces the offset error e(t) proportional to the trajectory slope. The difference in e(t) that this initial adjustment makes is small but important because it is a factor in the complete η-MPC solution.

Next, the effects of τ are considered. The removal of the offset is not achieved by ξ because standard prediction formulations are not designed to track sloped trajectories and therefore do not properly capture the effects of the system time constant. This is so since the time constant of the system prevents immediate response during the prediction made at each timestep and is magnified for sloped setpoint trajectories. Compensating for this in combination with the ξ adjustment provides the basis of the η solution.

When the transient properties of the controlled plant are constant, then multiplying ξ$_t$ by a compensating amount related to τ will eliminate the offset. This amount is η and the complete solution is expressed as an adjustment to the prediction. Note that the absolute value of η is used because η is a scalar:

$$\hat{y}_\eta|_t = \hat{y}|_t + |\eta_t|\xi_t \quad (16)$$

The η prediction form $\hat{y}_\eta$ replaces the standard approach where η has the form of an integral gain. In doing so the steady state offset is eliminated in a fashion similar to that of a PID controller but without the direct relationship to plant parameters that a PID would require. The results of implementing the prediction adjustment are shown in FIG. 5.

A block diagram representation of an η-MPC controller and method according to an embodiment of the present invention is shown in FIG. 6. In this embodiment the adjustment is applied to the prediction so that the optimizer reduces the error over the prediction horizon where the error is:

$$e(t) = r(t) - \hat{y}_\eta(t)$$

Where $$\hat{y}_\eta(t) = \hat{y}(t) + \text{adjustment}$$

Note, this configuration can be modified so that the adjustment is applied to the reference. FIG. 6 illustrates a manner in which a correction parameter for time lag can be applied to a conventional MPC controller without knowledge of the process model thereby increasing the performance of the MPC controller, particularly when used to track complex trajectories. In particular, the MPC controller of FIG. 6 is similar to that of FIG. 1 with like elements having the same reference numerals. However, an adjustment 10 (correction parameter) is provided to adjust for time lag and add this component to the prediction 12 output by the MPC control algorithm. This allows the optimizer to optimize for time lag.

A block diagram representation of an η-MPC controller and method according to another embodiment of the present invention is shown in FIG. 26. The MPC controller of FIG. 26 is similar to that of FIG. 6 with like elements having the same reference numerals. However, the adjustment 10 (correction parameter) is added to the reference trajectory 14. This allows the optimizer to optimize for time lag. In this embodiment the adjustment is applied to the reference trajectory as opposed to the prediction as in the embodiment of FIG. 6. The optimizer reduces the error over the prediction horizon where the error is:

$$e(t) = r_\eta(t) - \hat{y}(t)$$

Where $$r_\eta(t) = r(t) + \text{adjustment}$$

Selection and Tuning of η

For generality it is suggested that the value of η be calculated on-line with Eq. (17) given the condition that the error, $e_t = 0$ when using the correct value of η to track slopes. Therefore, the value of η can be obtained using the previous value error as $$\eta_t = \eta_{t-1} + e_{t-1} \quad (17)$$

The value of η at t=0 is $\eta_i$ and for the purpose of this study will be selected as zero. The η solution is calculated on-line and is adjusted at every time instant. Therefore, this method can be extended to non-linear controllers. The formulation of Eq. (17) can result in aggressive control move compensation. To solve this a weighting factor σ is used to condition the rate of change of η:

$$\eta_t = \eta_{t-1} + \sigma e_{t-1} \quad (18)$$

FIGS. 7, 8 and 9 present dynamics of a close loop MPC control when σ is varied and plant parameters along with sloped reference trajectory remain constant. If σ is too large then η forces excessive compensation in the calculation of the control actions resulting in oscillations in the response as seen in FIG. 7. The aggressive estimation of η is to blame for the poor control performance. The evolution of η for different values of a is shown in FIG. 8.

On the other hand if the value of a is too small, then η slowly converges to its optimal value. In this case the offset error is slowly reduced as seen in FIG. 9. If σ=0 then there will be no change in η and if $\eta_i$=0 then the control performance is that of a standard MPC where the offset error is not accounted for. The thick line in FIGS. 7, 8 and 9 emphasizes the desired dynamics that can be obtained with proper selection of a.

Values of $\eta_i$>0 will have an effect on the dynamics of the response and can be conditioned with proper selection of a. The best value for a will differ for slope trajectories because steeper reference trajectories will allow more aggressive growth of η without introducing overshoot into the response. In order to achieve the best control performance while using η-MPC to track sloped trajectories the reference trajectory slope and $\eta_i$ along with controller parameters that affect closed loop time constant characteristics will need to be considered. Basic optimization techniques were used to conduct a preliminary investigation on how the best value of sigma is affected by some plant parameters. The results while varying sampling time, dt and τ, are shown for a slope of 1 in FIG. 10. These preliminary results show large dependencies of a on plant properties.

In the above explanation of η-MPC examples are shown using constant slope trajectories. The η-MPC solution can easily be extended to continuous complex reference trajectories by approximating those trajectories as a series of slopes. From assumption one, the slope approximation is made on-line over three sampling instants. The results of such approximations are favorable and are shown in the Simulations and Experimental results sections, herein.

The formulation of the η introduces excessive growth during deadtime. To prevent this and for convenience a simple scheme is used to limit the increase of η. The value of η is evaluated $$\Delta\eta = \eta_t - \eta_{t-1} \tag{19}$$

and η is bounded to a maximum value. This process was used for the electric motor speed control and simulation examples presented in the Simulations and Results sections.

Simulations

The following is a description of the four plants used to conduct simulations using standard control schemes and schemes that include η. Important η-MPC design parameters can be found in Table 1.

TABLE 1

Important parameters for controller tuning.

| Plant | η-DMC | | η-GPC | |
|---|---|---|---|---|
| | σ | dt | σ | dt |
| Simulation Plant 1 | 0.01 | 0.02 | 0.5 | 0.02 |
| Simulation Plant 2 | 40 | 5 | 4 | 5 |
| Simulation Plant 3 | 2/2$^a$ | 0.02 | 2/5$^a$ | 0.02 |
| Simulation Plant 4 | 0.3 | 0.1 | 0.9 | 0.1 |

$^a$Output M1/Output M2.

Plant Models

The results presented below are simulations obtained in order to demonstrate the functionality of using η. Four different types of plants are simulated to test η. They are:
1. Linear first order
2. First order plus deadtime
3. Multivariable second order
4. First order non-linear Plant 1 is an elementary first order plant represented by the transfer function:

$$\frac{Y(s)}{U(s)} = \frac{10}{0.5s+1} \tag{20}$$

Plant 2 is described by Shridhar and Cooper (1997):

$$G_P(s) = \frac{e^{-50s}}{(150s+1)(25s+1)} \tag{21}$$

This plant was chosen to challenge η solution because it displays significant deadtime.

Plant 3 is a coupled mass-spring system and is an example of η extended to MIMO plants. This plant was also chosen to challenge η solution as it is a higher order lightly damped system. The plant dynamics are described in Chen, Lin and Chen (2008):

$$G_{11}(s) = \frac{0.58}{s^2 + 0.84s + 1.21} \tag{22a}$$

$$G_{12}(s) = \frac{1.03}{s^2 + 0.91s + 1.69} \tag{22b}$$

$$G_{21}(s) = \frac{0.68}{s^2 + 0.83s + 1.42} \tag{22c}$$

$$G_{22}(s) = \frac{0.88}{s^2 + 0.86s + 1.43} \tag{22d}$$

where $G_{11}$ represents the effects of forces applied to mass 1 on the response of mass 1, $G_{12}$ represents the effects of forces applied to mass 2 on the response of mass 1, $G_{21}$ represents the effects of forces applied to mass 1 on the response of mass 2 and $G_{22}$ represents the effects of forces applied to mass 2 on the response of mass 2.

To investigate the potential of using on nonlinear plants, plant 4 is a system with deadtime having nonlinear behavior (Abu-Ayyad & Dubay, 2010):

$$y(t) = \frac{y_{t-1} * y_{t-2} * (y_{t-1} + 2.5)}{1 + y_{t-1}^2 + y_{t-2}^2 + u_t} \tag{23}$$

A unit step response of Eq. (23) is used to create the P matrix equation (1) and the CARIMA model equation (6) for the design of the linear simulated DMC and GPC controllers:

$$\frac{Y(s)}{U(s)} = \frac{4.32 e^{-0.3s}}{0.43s + 1} \tag{24}$$

Plant 4 in Eq. (23) is used in order to demonstrate the potential of using η methodology to control nonlinear plants while the standard MPC linear structure remains intact Eq. (23).

Results

The following are simulated controlled responses of the above four plants.

Plant 1

FIG. 11 shows the closed-loop response to tracking a complex trajectory approximated as a series of slopes. The results presented in Table 2 show a comparison of mean squared error, MSE for the η approach (termed η-DMC) and the standard DMC.

TABLE 2

MPC and η-MPC MSE results for plant 1.

| Trajectory | MSE, DMC | MSE, η-DMC | MSE, GPC | MSE, η-GPC |
|---|---|---|---|---|
|  | 0.3291 | 0.3291 | 0.0809 | 0.0809 |
|  | 20.0406 | 3.8710 | 0.1646 | 0.0261 |
|  | 4.0777 | 0.2513 | 0.0327 | 0.0018 |
|  | 513.9559 | 68.4394 | 3.6982 | 0.4661 |
|  | 618.8692 | 8.4243 | 6.7357 | 0.1641 |

The above simulation tests using η conducted for DMC were repeated using GPC in FIG. 12. The comparison of MSE for GPC and η-GPC was conducted and is presented in Table 1.

The results in FIGS. 11 and 12 demonstrate the control performance improvement that makes over both standard algorithms, when tracking complex reference profiles for Plant 1. This is also evident in the reduction of MSE values as in Table 1.

Plant 2

The results of the simulations shown in FIGS. 13 and 14 clearly present the improvement of using η on the MPC controllers.

In these simulations η handles the large deadtime attribute of Plant 2. Note that the approach here demonstrates the use of an unconstrained η with an appropriate constant value of u. Further improvement can be achieved using a calculated varying value of σ. The key point however is that the offset error is significantly reduced over larger time scales.

Plant 3

The third simulated plant is a MIMO plant that is second order and lightly damped. The η method can be extended to each output prediction of the MIMO plant.

In FIGS. 15 and 16 η is not constrained and as a result of the higher order dynamics, relatively high oscillations are obtained. Comparatively, the offset error is significantly reduced.

When η is constrained the overshoot is suppressed and the oscillation decay faster for good setpoint tracking. The simulated results of the constrained η simulations are illustrated in FIGS. 17 and 18 with improved closed-loop responses over the standard MPC control algorithms.

Plant 4

The nonlinear Plant 4 simulation results are shown in FIGS. 19 and 20.

Overall, both traditional controllers demonstrated improved control performance using η. A key point is that the η based GPC showed the best tracking since the structure of GPC provides better prediction and consequently improved control. It should be noted that this simulation demonstrates the effectiveness of η to a nonlinear plant: the controllers are formulated using the linear transfer function equation (24) while simulated y is obtained from the nonlinear model equation (23).

Experimental Results

Experiments were conducted on a motor/tachogenerator set-up depicted in FIG. 21 in which the new MPC controller technique described herein may be implemented in the process controller implemented in the CPU.

In the conducted experiment, dt=0.02 s and σ=0:05 for the η-DMC and η-GPC controllers. The results of DMC and η-DMC control performance of the electric motor are shown in FIGS. 22 and 23.

The MSE recorded during the experiments was reduced by an approximate factor of 8 using the η-DMC algorithm. GPC and η-GPC were subjected to the same reference trajectories as in the above test. The CARIMA model for both GPC controllers was altered for these experiments to demonstrate how the η-GPC controller can compensate for model mismatch. The model mismatch was created by modifying $A(z^{-1})$ polynomial. Similarly, a control performance improvement was observed as shown in FIG. 24 demonstrating that model mismatch can be effectively handled by the η approach. The result when removing the model mismatch is shown in FIGS. 24 and 25.

While the improvement in both plots is not easily perceived, the MSE recorded during the experiments was reduced by an approximate factor of 3 using the η-GPC algorithm.

Although the invention has been described with reference to the specific exemplary embodiments intended to instruct and illustrate the invention, the disclosed MPC controller and technique is not limited to those embodiments. Various modifications, improvements and additions may be implemented by those with skill in the art, and such modifications, improvements, and additions will not depart from the scope of the invention.

Also, those skilled in the art will understand that the partitioning of individual components of the MPC controller blocks and controller units as described herein is discretionary to those responsible for controller implementation and operation. It will be understood that all of these functions can be implemented in any desired manner on any desired device(s). Moreover, while the MPC controller technique described herein is preferably implemented in software, it or any portions thereof may be implemented in hardware, firmware, etc., and may be implemented by any other processor associated with a process control system. Thus, the elements described herein may be implemented in a standard multi-purpose CPU or on specifically designed hardware or firmware such as an application-specific integrated circuit (ASIC) or other hard-wired device as desired. When implemented in software, the software routine may be stored in any computer readable memory such as on a magnetic disk, a laser disk (such as a CD, a DVD, etc.), a flash drive or other storage medium, in a RAM or ROM of a computer or processor, in any database, etc. Likewise, this software may be delivered to a user or a plant such as a process plant via any known or desired delivery method including, for example, on a computer readable disk, a smart card memory, a flash drive, or other transportable computer storage mechanism or over a communication channel such as a telephone line, the internet, etc. (which are viewed as being the same as or interchangeable with providing such software via a transportable storage medium).

Moreover, the claims provided herein are properly construed to embrace all modifications, variations and improvements that fall within the true spirit and scope of the invention, as well as substantial equivalents thereof. Accordingly, other embodiments of the invention, although not described with particularly herein, are none-the-less comprehended within the scope of the invention.

REFERENCES

Abu-Ayyad, M., & Dubay, R. (2006). SISO extended predictive control-formulation and the basic algorithm ISA Transactions, 45, 9-20.

Abu-Ayyad, M., & Dubay, R. (2010). Improving the performance of generalized predictive control for nonlinear processes. Industrial & Engineering Chemistry Research, 49(10), 4809-4816.

Ali, J., Yu, J., & Hauser, J. (2001). Unconstrained receding-horizon control of nonlinear systems. IEEE Transactions on Automatic Controls, 46(5), 776-783.

Bolognani, S., Peretti, L., & Zigliotto, M. (2009). Design and implementation of model predictive control for electrical motor drives. IEEE Transactions on Industrial Electronics, 56(6), 1925-1936.

Chen, C.-H., Lin, C.-M., & Chen, T.-Y (2008). Intelligent adaptive control for MIMO uncertain nonlinear systems. Expert Systems with Applications, 35(3), 865-877.

Clark, D., Mohtadi, C., & Tuffs, P. S. (1987). Generalized predictive control—part 1. The basic algorithm. Automatica, 23(2), 137-148.

Dalamagkidis, K., Valavanis, K. P., & Piegl, L. A. (2011). Nonlinear model predictive control with neural network optimization for autonomous autorotation of small unmanned helicopters. IEEE Transactions on Control System Technology, 19, 818-831.

Diehl, M., Amrit, R., & Rawlings, J. B. (2011). A Lyapunov function for economic optimizing model predictive control. IEEE Transactions on Automatic Control, 56, 703-707.

Dubay, R., Kember, G., Lakshminarayan, C., & Pramujati, B. (2006). Development of characteristic equations and robust stability analysis for SISO move suppressed and shifted DMC. ISA Transactions, 45, 21-33.

Dubay, R., Pramujati, B., Han, J., & Strohmaier, F. (2007). An investigation on the application of predictive control for controlling screw position and velocity on an injection molding machine. Polymer Engineering and Science, 47, 390-399.

Golshan, M., MacGregor, J. F., Bruwer, M.-J., & Mhaskar, P. (2010). Latent variable Model Predictive Control (LV-MPC) for trajectory tracking in batch processes. Journal of Process Control, 20, 538-550.

Gregor, K., & Skrjanc, I. (2007). Tracking-error model-based predictive control for mobile robots in real time. Robotics and Autonomous Systems, 55, 460-469.

Hassan, M., Dubay, R., Li, C., & Wang, R. (2007). Active vibration control of flexible one-link manipulator using a multivariable predictive controller. Mechatronics, 17, 311-323.

Jesus, F.-C., & MacGregor, J. F. (2005). Latent variable MPC for trajectory tracking in batch processes. Journal of Process Control, 15, 621-663.

Kim, H. J., & Shim, D. H. (2003). A flight control system for aerial robots: Algorithms and experiments. Control Engineering Practice, 11, 1389-1400.

Lauri, D., Rossiter, J. A., Sanchisa, J., & Martineza, M. (2010). Data-driven latent-variable model-based predictive control for continuous processes. Journal of Process Control, 20, 1207-1219.

Lee, J. H. (2011). Model predictive control: Review of the three decades of development. International Journal of Control, Automation, and Systems, 9, 415-424.

Li, T.-H. S., Su, Y.-T., Shao-Hsien Liu, J.-J. H., & Chen, C.-C. (2012). Dynamic balance control for biped robot walking using sensor fusion, Kalman filter, and fuzzy logic. IEEE Transactions on Industrial Electronics, 59, 4394.

Magni, L., & Scattolini, R. (2005). On the solution of the tracking problem for nonlinear systems with MPC. International Journal of Systems Science, 36, 477-484.

Mayne, D., Rawlings, J., Rao, C., & Scokaert, P. (2000). Constrained model predictive control: Stability and optimality. Automatica, 36, 789-814.

Qin, S. J., & Badgwell, T. A. (2003). A survey of industrial model predictive control technology. Control Engineering Practice, 2, 733-764.

Rawlings, J. B., & Mayne, D. Q. (2009). Model predictive control: Theory and design. Madison, Wis.: Nob Hill Publishing.

Ren, W., & Beard, R. W. (2004). Trajectory tracking for unmanned air vehicles with velocity and heading rate constraints. IEEE Transactions on Control Systems Technology, 12, 706-716.

Runzi, C., & Low, K.-S. (2009). A repetitive model predictive control approach for precision tracking of a linear motion system. IEEE Transactions on Industrial Electronics, 56, 1955-1961.

Shridhar, R., & Cooper, D. J. (1997). A tuning strategy for unconstrained SISO model predictive control. Industrial & Engineering Chemistry Research, 36, 729-746.

Yang, Y., & Gao, F. (2000). Adaptive control of the filling velocity of thermoplastics injection molding. Control Engineering Practice, 8, 1285-1296.

We claim:

1. A method for controlling a machine controlled by a model predictive controller, comprising:

measuring a difference between a prediction model output of the model predictive controller and a complex reference trajectory;

calculating a correction parameter based on the measured difference using the equation $$\eta_t = \eta_{t-1} + e_{t-1}$$

where $\eta$ is the correction parameter and $e$ is the measured difference;

conditioning the rate of change of $\eta$ using the equation $$\eta_t = \eta_{t-1} + \sigma e_{t-1}$$

where $\eta$ is the correction parameter, $\sigma$ is a weighting factor, and $e$ is the measured difference;

applying the correction parameter to the prediction model output using the equation $$\hat{y}_{\eta|t} = \hat{y}_{l,t} + |\eta_t| \xi_t$$

where $\hat{y}$ is the prediction model output, $\xi$ is a reference trajectory slope and $\eta$ is the correction parameter, to adjust the prediction model output for machine time constant, wherein the machine time constant is internal to the machine; and controlling the machine using the adjusted prediction model output.

2. The method of claim 1, including wherein the steps of measuring the difference and applying the correction parameter are carried out on-line.

3. The method of claim 2, wherein the machine being controlled has a trajectory profile where the reference trajectory is varying with respect to time.

4. The method of claim 3, further comprising providing the adjusted prediction model output to an optimizer of the model predictive controller.

5. The method of claim 3, wherein the step of calculating the correction parameter further comprising applying an optimization method to calculate the correction parameter.

6. The method of claim 1, further including repeating the measuring, calculating and applying steps at one or more additional sampling instances.

7. The method of claim 1, wherein the machine is selected from the group consisting of a robot, a UAV, an injection molding machine and a smart technologies machine.

8. A method for controlling a machine comprising:

correcting a complex reference trajectory in a model predictive controller for controlling the machine comprising:

calculating a correction parameter based on the measured difference using the equation $\eta_t = \eta_{t-1} + e_{t-1}$ where $\eta$ is the correction parameter and e is the measured difference;

conditioning the rate of change of $\eta$ using the equation $\eta_t = \eta_{t-1} + \sigma e_{t-1}$ where $\eta$ is the correction parameter, $\sigma$ is a weighting factor, and e is the measured difference;

applying the correction parameter to the prediction model output using the equation $\hat{y}_{\eta|t} = \hat{y}_{t|t} + |\eta_t|\xi_t$ where $\hat{y}$ is the prediction model output, $\xi$ is a reference trajectory slope and $\eta$ is the correction parameter, to adjust the prediction model output for machine time constant, wherein the machine time constant is internal to the machine; and controlling the machine using the adjusted prediction model output.

9. The method of claim 8, including wherein the steps of measuring the difference and applying the correction parameter are carried out on-line.

10. The method of claim 9, wherein the machine being controlled has a trajectory profile where the reference trajectory is varying with respect to time.

11. The method of claim 10, further comprising providing the adjusted reference to an optimizer of the model predictive controller.

12. The method of claim 10, wherein the step of calculating the correction parameter further comprising applying an optimization method to calculate the correction parameter.

13. The method of claim 8, further including repeating the measuring, calculating and applying steps at one or more additional sampling instances.

14. A device for controlling a machine comprising:

a model predictive controller unit comprising a memory tor storing at least instructions and a processor device that executes the instructions to enable actions including:

generating a prediction model;

measuring a difference between the prediction model and a complex reference trajectory;

calculating a correction parameter based on the measured difference using the equation $\eta_t = \eta_{t-1} + e_{t-1}$ conditioning the rate of change of $\eta$ using the equation $\eta_t = \eta_{t-1} + \sigma e_{t-1}$ where $\eta$ is the correction parameter, sigma $\sigma$ is a weighting factor, and e is the measured difference;

applying the correction parameter to the prediction model output using the equation $\hat{y}_{\eta|t} = \hat{y}_{t|t} + |\eta_t|\xi_t$ where $\hat{y}$ is the prediction model output, $\xi$ is a reference trajectory slope and $\eta$ is the correction parameter to adjust the prediction model output for machine time constant, wherein the machine time constant is internal to the machine.

15. The device of claim 14, wherein the controller unit measures the difference and applies the correction on-line.

16. The device of claim 15, wherein the machine being controlled has a trajectory profile where the reference trajectory is varying with respect to time.

17. The device of claim 16, wherein the controller further comprises an optimizer and provides the adjusted prediction model output to the optimizer.

18. A device for controlling a machine comprising:

a model predictive controller unit comprising a memory for storing at least instructions and a processor device that executes the instructions to enable actions including generating a prediction model output;

measuring a difference between the prediction model output and a complex reference trajectory;

calculating a correction parameter based on the measured difference using the equation $\eta_t = \eta_{t-1} + e_{t-1}$ where $\eta$ is the correction parameter and e is the measured difference;

conditioning the rate of change of $\eta$ using the equation $\eta_t = \eta_{t-1} + \sigma e_{t-1}$ applying the correction parameter and a reference trajectory slope $\xi_t$ value to the complex reference trajectory to adjust the prediction model output for machine time constant, wherein the machine time constant is internal to the machine; and controlling the machine using the adjusted prediction model output.

* * * * *